United States Patent
Larsen et al.

(10) Patent No.: US 9,836,464 B2
(45) Date of Patent: Dec. 5, 2017

(54) CURATING MEDIA FROM SOCIAL CONNECTIONS

(71) Applicant: Microsoft Technology Licensing, LLC, Redmond, WA (US)

(72) Inventors: Mark S. Larsen, Redmond, WA (US); David J. Lee, Redmond, WA (US); Joshua J. Debner, Seattle, WA (US); Joshua B. Weisberg, Redmond, WA (US); Owen W. Paulus, Seattle, WA (US); Richard D. Prologo, Sammamish, WA (US); Stacia L. C. Scott, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 240 days.

(21) Appl. No.: 14/448,913

(22) Filed: Jul. 31, 2014

(65) Prior Publication Data

US 2016/0034459 A1 Feb. 4, 2016

(51) Int. Cl.
*G06F 17/30* (2006.01)
*G06F 7/00* (2006.01)
*G06Q 50/00* (2012.01)

(52) U.S. Cl.
CPC .. *G06F 17/30044* (2013.01); *G06F 17/30041* (2013.01); *G06F 17/30598* (2013.01); *G06F 17/30864* (2013.01); *G06Q 50/01* (2013.01)

(58) Field of Classification Search
CPC ......... G06F 17/30044; G06F 17/30041; G06F 17/30598; G06F 17/30864; G06Q 50/01

USPC ....................................................... 707/740
See application file for complete search history.

(56) References Cited

U.S. PATENT DOCUMENTS

| | | |
|---|---|---|
| 5,305,389 A | 4/1994 | Palmer |
| 5,623,666 A | 4/1997 | Pike et al. |
| 6,385,641 B1 | 5/2002 | Jiang et al. |
| 6,877,134 B1 | 4/2005 | Fuller et al. |
| 6,901,403 B1 | 5/2005 | Bata et al. |
| 6,950,535 B2 | 9/2005 | Sibayama et al. |

(Continued)

OTHER PUBLICATIONS

Can I see a Skydrive folder in Windows as computer disk?, retrieved from <<http://forums.techarena.in/technology-internet/1386082.htm>> on Aug. 5, 2011, 3 pages.

(Continued)

*Primary Examiner* — Pavan Mamillapalli
(74) *Attorney, Agent, or Firm* — Arent Fox LLP

(57) ABSTRACT

Media files may be curated for a user based on a location of a client device associated with the user. A user carrying a client device may arrive at a particular location on a given day. A computer-implemented process may include determining whether the given day and/or the particular location is "unique" to the user in some fashion, which may be based on one or more criteria used to quantify or otherwise evaluate uniqueness of the day or location. At least partly in response, media file sharing service may be queried to identify shared media files that were created at the particular location, wherein the shared media files are associated with one or more entities having social connections to the user. A curated subset of the identified media files may be automatically created and a notification may be issued to the user.

20 Claims, 9 Drawing Sheets

(56) References Cited

U.S. PATENT DOCUMENTS

| | | | |
|---|---|---|---|
| 7,020,848 B2 | 3/2006 | Rosenzweig et al. | |
| 7,028,253 B1 * | 4/2006 | Lieberman | G06F 17/30265 345/625 |
| 7,159,174 B2 | 1/2007 | Johnson et al. | |
| 7,277,880 B1 * | 10/2007 | Sekine | G06F 17/30011 358/444 |
| 7,336,887 B2 | 2/2008 | Satoh et al. | |
| 7,366,742 B1 | 4/2008 | Umbehocker et al. | |
| 7,496,642 B2 | 2/2009 | Gill et al. | |
| 7,587,419 B2 | 9/2009 | Thorpe et al. | |
| 7,613,689 B2 | 11/2009 | Arrouye et al. | |
| 7,634,478 B2 | 12/2009 | Yang et al. | |
| 7,668,842 B2 | 2/2010 | LaChapelle et al. | |
| 7,693,911 B2 | 4/2010 | Wories et al. | |
| 7,716,317 B2 | 5/2010 | Kumar et al. | |
| 7,730,113 B1 | 6/2010 | Payette et al. | |
| 7,752,265 B2 | 7/2010 | Svendsen et al. | |
| 7,818,336 B1 * | 10/2010 | Amidon | G06F 17/30864 707/769 |
| 7,856,380 B1 | 12/2010 | Latin-Stoermer et al. | |
| 7,882,115 B2 | 2/2011 | Hirsch | |
| 7,908,273 B2 | 3/2011 | DiMaria et al. | |
| 7,966,184 B2 | 6/2011 | O'Conor et al. | |
| 7,987,490 B2 | 7/2011 | Ansari et al. | |
| 7,992,103 B2 | 8/2011 | Gusmorino et al. | |
| 8,060,514 B2 | 11/2011 | Arrouye et al. | |
| 8,094,948 B2 | 1/2012 | Jain et al. | |
| 8,108,430 B2 | 1/2012 | Wong et al. | |
| 8,131,118 B1 * | 3/2012 | Jing | G01C 21/20 382/305 |
| 8,200,704 B2 | 6/2012 | Petakov et al. | |
| 8,266,115 B1 | 9/2012 | Park et al. | |
| 8,280,861 B1 | 10/2012 | Park et al. | |
| 8,285,810 B2 | 10/2012 | Svendsen et al. | |
| 8,291,349 B1 | 10/2012 | Park et al. | |
| 8,296,380 B1 | 10/2012 | Kelly et al. | |
| 8,332,402 B2 | 12/2012 | Forstall et al. | |
| 8,341,037 B2 | 12/2012 | Bachman et al. | |
| 8,402,071 B2 | 3/2013 | Skillcorn | |
| 8,464,133 B2 | 6/2013 | Grube et al. | |
| 8,554,784 B2 | 10/2013 | Nurminen et al. | |
| 8,594,702 B2 | 11/2013 | Naaman et al. | |
| 8,612,888 B2 | 12/2013 | Pennington et al. | |
| 8,634,674 B2 | 1/2014 | Hanechak | |
| 8,745,513 B2 | 6/2014 | Crystal | |
| 8,756,510 B2 | 6/2014 | Bhumkar et al. | |
| 8,793,282 B2 | 7/2014 | Hedinsson et al. | |
| 8,819,079 B2 | 8/2014 | Bush et al. | |
| 8,843,744 B2 | 9/2014 | Sentinelli et al. | |
| 8,990,255 B2 | 3/2015 | Metsatahti et al. | |
| 9,269,150 B1 * | 2/2016 | Seitz | G06F 3/04847 715/833 |
| 2003/0033402 A1 | 2/2003 | Battat et al. | |
| 2004/0024580 A1 | 2/2004 | Salmonsen et al. | |
| 2004/0139169 A1 | 7/2004 | O'Brien et al. | |
| 2004/0141637 A1 | 7/2004 | Bacus et al. | |
| 2004/0162830 A1 * | 8/2004 | Shirwadkar | G06F 17/3087 707/999.01 |
| 2005/0105884 A1 | 5/2005 | Satoh et al. | |
| 2005/0246352 A1 | 11/2005 | Moore et al. | |
| 2005/0251566 A1 | 11/2005 | Weel | |
| 2006/0080401 A1 | 4/2006 | Gill et al. | |
| 2006/0107056 A1 | 5/2006 | Bhatt et al. | |
| 2006/0146765 A1 | 7/2006 | Van De Sluis et al. | |
| 2006/0155723 A1 | 7/2006 | Kumar et al. | |
| 2006/0195481 A1 | 8/2006 | Arrouye et al. | |
| 2006/0271691 A1 | 11/2006 | Jacobs et al. | |
| 2007/0005334 A1 | 1/2007 | Salmonsen | |
| 2007/0033225 A1 | 2/2007 | Davis | |
| 2007/0033279 A1 | 2/2007 | Battat et al. | |
| 2007/0050467 A1 | 3/2007 | Borrett et al. | |
| 2007/0169165 A1 | 7/2007 | Crull et al. | |
| 2007/0208687 A1 | 9/2007 | O'Conor et al. | |
| 2007/0214180 A1 | 9/2007 | Crawford | |
| 2007/0288478 A1 | 12/2007 | DiMaria et al. | |
| 2007/0300158 A1 | 12/2007 | Kasperkiewicz et al. | |
| 2008/0005348 A1 | 1/2008 | Kosiba et al. | |
| 2008/0040359 A1 | 2/2008 | Arrouye et al. | |
| 2008/0059535 A1 | 3/2008 | Lindsley et al. | |
| 2008/0092054 A1 | 4/2008 | Bhumkar et al. | |
| 2008/0120571 A1 | 5/2008 | Chang et al. | |
| 2008/0189303 A1 | 8/2008 | Bush et al. | |
| 2009/0113301 A1 | 4/2009 | Fisher et al. | |
| 2009/0144642 A1 | 6/2009 | Crystal | |
| 2009/0183077 A1 | 7/2009 | Hakim et al. | |
| 2009/0193024 A1 | 7/2009 | Dhananjaya | |
| 2009/0196510 A1 * | 8/2009 | Gokturk | G06F 17/30253 382/224 |
| 2009/0198581 A1 | 8/2009 | Lidestri | |
| 2009/0265416 A1 | 10/2009 | Svendsen et al. | |
| 2010/0005168 A1 | 1/2010 | Williams et al. | |
| 2010/0005397 A1 | 1/2010 | Lanahan et al. | |
| 2010/0023691 A1 | 1/2010 | Shin | |
| 2010/0042648 A1 | 2/2010 | Cannon et al. | |
| 2010/0094934 A1 | 4/2010 | Svendsen et al. | |
| 2010/0138809 A1 | 6/2010 | Shenfield et al. | |
| 2010/0191783 A1 | 7/2010 | Mason et al. | |
| 2010/0191827 A1 | 7/2010 | Martin | |
| 2010/0205178 A1 | 8/2010 | Bush et al. | |
| 2010/0211575 A1 | 8/2010 | Collins et al. | |
| 2010/0262582 A1 | 10/2010 | Garcia-Ascanio et al. | |
| 2010/0281382 A1 | 11/2010 | Meaney et al. | |
| 2010/0299417 A1 | 11/2010 | Austin et al. | |
| 2010/0299697 A1 | 11/2010 | Austin et al. | |
| 2010/0332456 A1 | 12/2010 | Prahlad et al. | |
| 2011/0029635 A1 | 2/2011 | Shkurko et al. | |
| 2011/0055765 A1 | 3/2011 | Neubrand et al. | |
| 2011/0087531 A1 | 4/2011 | Winters et al. | |
| 2011/0087674 A1 | 4/2011 | Schokking et al. | |
| 2011/0099199 A1 | 4/2011 | Stalenhoef et al. | |
| 2011/0106798 A1 | 5/2011 | Li et al. | |
| 2011/0154198 A1 | 6/2011 | Bachman et al. | |
| 2011/0161174 A1 | 6/2011 | Simms et al. | |
| 2011/0161409 A1 | 6/2011 | Nair et al. | |
| 2011/0231192 A1 | 9/2011 | O'Conor et al. | |
| 2011/0231745 A1 | 9/2011 | Levesque et al. | |
| 2011/0283185 A1 | 11/2011 | Obasanjo et al. | |
| 2011/0289421 A1 | 11/2011 | Jordan et al. | |
| 2012/0030213 A1 | 2/2012 | Arrouye et al. | |
| 2012/0078953 A1 | 3/2012 | Araya | |
| 2012/0113964 A1 | 5/2012 | Petersen et al. | |
| 2012/0154419 A1 | 6/2012 | Nagata et al. | |
| 2012/0185880 A1 | 7/2012 | Jalon et al. | |
| 2012/0208168 A1 | 8/2012 | Atkinson et al. | |
| 2012/0271823 A1 | 10/2012 | Asikainen et al. | |
| 2012/0290654 A1 | 11/2012 | Detwiller et al. | |
| 2012/0301039 A1 | 11/2012 | Maunder et al. | |
| 2012/0311481 A1 | 12/2012 | Reyna et al. | |
| 2012/0331141 A1 | 12/2012 | Carter et al. | |
| 2013/0004073 A1 | 1/2013 | Yamaji et al. | |
| 2013/0019273 A1 | 1/2013 | Ma et al. | |
| 2013/0024424 A1 | 1/2013 | Prahlad et al. | |
| 2013/0027613 A1 | 1/2013 | Kim et al. | |
| 2013/0047123 A1 | 2/2013 | May et al. | |
| 2013/0067346 A1 | 3/2013 | Rosenstein et al. | |
| 2013/0091204 A1 | 4/2013 | Loh et al. | |
| 2013/0097685 A1 * | 4/2013 | Kennedy | G06F 17/30905 726/8 |
| 2013/0148864 A1 | 6/2013 | Dolson et al. | |
| 2013/0191767 A1 | 7/2013 | Peters et al. | |
| 2013/0198176 A1 | 8/2013 | Kim | |
| 2013/0339446 A1 | 12/2013 | Balassanian et al. | |
| 2014/0022265 A1 | 1/2014 | Canan | |
| 2014/0059139 A1 | 2/2014 | Filev et al. | |
| 2014/0143247 A1 | 5/2014 | Rathnavelu et al. | |
| 2014/0143351 A1 | 5/2014 | Deng | |
| 2014/0143439 A1 | 5/2014 | Ramamurthy | |
| 2014/0189557 A1 | 7/2014 | O'Connell, Jr. et al. | |
| 2014/0195976 A1 * | 7/2014 | Ow | G06F 3/04847 715/833 |

(56) References Cited

U.S. PATENT DOCUMENTS

2015/0046500 A1 2/2015 Bush et al.
2015/0356121 A1* 12/2015 Schmelzer ........ G06F 17/30289
  707/803

OTHER PUBLICATIONS

Final Office Action for U.S. Appl. No. 13/551,297, dated Nov. 4, 2014, Canan et al,, "Image Curation", 8 pages.
Final Office Action for U.S. Appl. No. 13/229,554, dated Dec. 4, 2013, Rosenstein et al., "Content User Experience", 19 pages.
International Search Report & Written Opinion Issued in PCT Application No. PCT/US2015/042187, dated Oct. 20, 2015, 10 Pages.
Non-final Office Action for U.S. Appl. No. 13/229,554, dated Aug. 16, 2013, Rosenstein et al., "Content User Interface", 16 pages.
Non-final Office Action for U.S. Appl. No. 13/551,297, dated May 23, 2014, Canan et al,, "Image Curation", 17 pages.
Non-final Office Action for U.S. Appl. No. 13/229,554, dated Nov. 17, 2014, Rosenstein et al,, "Content User Interface", 25 pages.
Snavely, Noah et al., "Modeling the World from Internet Photo Collections," International Journal of Computer Vision, vol. 80, Issue 2, available at <<http://phototour.cs.washington.edu/ModelingTheWorld_ijcv07.pdf>>, (Nov. 2008), 22 pages.
Windows Live Logo Windows Live SkyDrive, retrievedf from <<http://toostep.com/trends/india-one-three-chosen-te-test-skydrive-online-storage>> on Aug. 5, 2011, 2 pages.
Windows Phone—Pictures Hub, retrieved from <<http://www.microsoft.com/windowsphone/en-gb/howto/wp7/pictures/pictures-hub.aspx>>, dated Jun. 21, 2012, 2 pages.
PCT Search Report & Written Opinion for Application No. PCT/US13/50583, dated Oct. 18, 2013, 8 pgs.
"Always Connected," http://www.samsung.com/global/microsite/galaxycamera/nx/, Jun. 2013, 5 pages.
Hepburn, et al., "Color: The Location Based Social Photo App," http://www.digitalbuzzblog.com/color-the-location-based-social-photo-iphone-app/, Mar. 2011, 12 pages.
"Using a Flickr to Organize a Collection of Images," http://www.jiscdigitalmedia.ac.uk/guide/using-flickr-to-organise-a-collection-of-images, Apr. 2013, 17 pages.
Office Action for U.S. Appl. No. 13/229,554, dated Nov. 17, 2014, Daniel Rosenstein, "Content User Experience", 25 pages.
Office Action for U.S. Appl. No. 13/229,554, dated Feb. 27, 2015, Daniel Rosenstein, "Content User Experience", 29 pages.
Office Action for U.S. Appl. No. 13/229,554, dated Feb. 3, 2016, Daniel Rosenstein, "Content User Experience", 49 pages.
Office Action for U.S. Appl. No. 13/229,554, dated Jun. 16, 2016, Daniel Rosenstein, "Content User Experience", 35 pages.
Office Action for U.S. Appl. No. 14/746,298, dated Aug. 28, 2015, Ramona P. Canan, "Image Curation", 6 pages.
PCT Written Opinion of the International Preliminary Examining Authority dated Jun. 30, 2016 for PCT application No. PCT/US2015/042187, 5 pages.
International Preliminary Report on Patentability Issued in PCT Application No. PCT/US2015/042187, dated Oct. 31, 2016, 7 Pages.

* cited by examiner

CURATING MEDIA FROM SOCIAL CONNECTIONS

BACKGROUND

With advancements in digital media capture and storage technology, it has become much easier for the average user to create and store media files (e.g., digital images, videos, sound clips, etc.). Users can easily take pictures, record video, and audio using smart phones and similar mobile devices. Moreover, web-based storage services (often referred to as "cloud" storage services) have made it easier for users to store massive collections of media files in "the cloud," and social networking applications provide a mechanism for easily sharing media files online with an audience comprised of one's social connections. As users continue to create media files, improvements are needed for the products and services associated with those media files.

SUMMARY

Described herein are techniques and systems for curating a set of media files for a user based on a location of a client device associated with the user. Accordingly, a user carrying a client device may arrive at a particular location on a given day. In some scenarios, the user may create one or more media files (e.g., take a photo with the client device) at the particular location. A computer-implemented process may include determining the given time (e.g., day and/or time of day) and the particular location, and further determining whether the given time or the particular location is "unique" to the user in some fashion. That is, the given time or the particular location may be deemed "unique" if the time or location is somehow unusual or otherwise not typical with respect to the user. Determining the "uniqueness" of the given time or the particular location may be based on one or more criteria used for quantifying or otherwise evaluating uniqueness of the time or location. Determining the uniqueness of the time or location with respect to the user of the client device allows for selectively notifying the user of curated media files by notifying the user on noteworthy occasions, and refraining from notifying the user on otherwise typical or predictable occasions.

At least partly in response to determining that at least one of the given time or the particular location is unique to the user, the computer-implemented process may continue by querying a media file sharing service to identify shared media files that were created at the particular location. The shared media files that are identified may be associated with one or more entities having social connections to the user. In this manner, the identified media files are relevant to the user in that the user recognizes the one or more entities as familiar acquaintances (e.g., friends, family, coworkers, etc.). A curated subset of the identified media files may be automatically created in the form of a "virtual" album (i.e., a system-created album). A notification may be issued to the user via the client device to alert the user of the curated subset.

By curating a set of media files that are associated with one or more entities having social connections to the user, the user may be delighted by viewing media files of their friends and family that were created at, or near, the same location as the user. The user may also be incentivized to share, with the one or more entities, a curated set of the user's own media files created at the location, to initiate a dialogue with the one or more entities, and/or interact with the media files in the curated set. In this manner, the experience of the user at the particular location may be enhanced into a more magical experience.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicates similar or identical items.

DETAILED DESCRIPTION

Embodiments of the present disclosure are directed to, among other things, techniques and systems for curating a set of media files for a user based on a location of a client device associated with the user. The techniques and systems described herein may be implemented in a number of ways and may be utilized for curating any type of media file. For illustrative purposes, media files are often described as digital images herein. However, it is to be appreciated that the techniques and systems disclosed herein may be used to curate any suitable type of media file, singularly or in combination with other types of media files. A non-exhaustive list of media file types contemplated herein includes images (e.g., photographs), videos, graphics, animation, audio, text (e.g., documents), interactive media, or any other suitable type of media file, or combinations (i.e., multimedia) thereof. Thus, the techniques and systems described herein are not limited to curation of digital images.

Example Architecture

Figure 1:
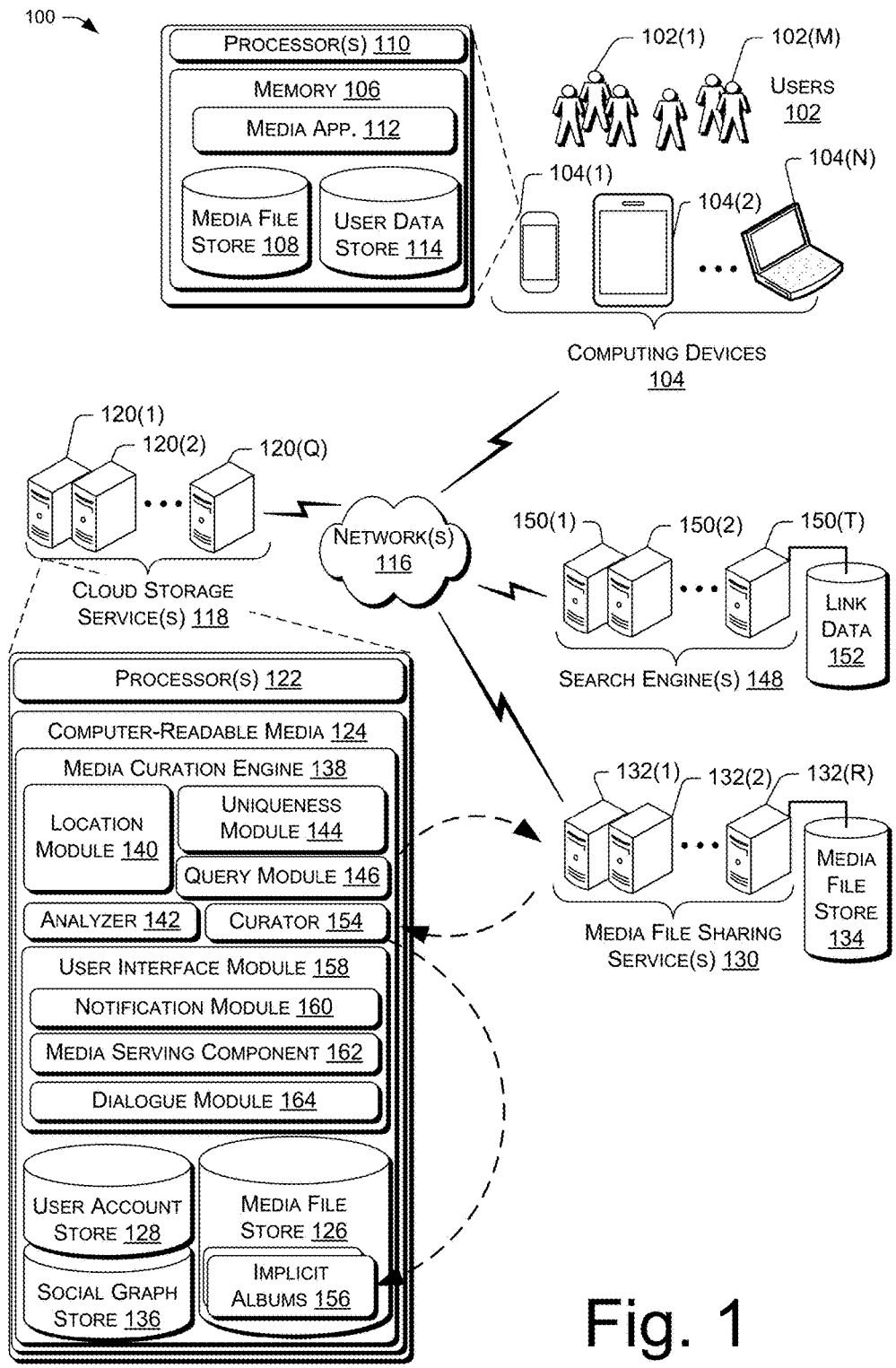
FIG. 1 is a schematic diagram of an example architecture for curating a set of media files for a user based on a location of a client device associated with the user.

FIG. 1 is a schematic diagram of an example architecture 100 that is usable to enable users 102(1), . . . , 102(M) (collectively 102) operating respective computing devices 104(1), . . . , 104(N) (collectively 104, and sometimes referred to as "client" computing devices, or "local" computing devices) to engage in creating/obtaining, storing, and otherwise managing media files, such as a personal collection of digital images. The architecture 100 is merely one example, and the techniques described herein are not limited to performance using the architecture of FIG. 1, nor are they limited to digital images as a media file type, as mentioned above.

Within the architecture 100, the users 102, in some instances, may operate the computing devices 104 to create one or more media files. For example, the computing devices 104 may include, or may be connectable to, one or more media capture components (e.g., a camera(s), a microphone(s), etc.) for capturing data (e.g., still image data, video data, audio data, etc.) and storing in memory 106 the captured data digitally in media file format. Furthermore, the users 102 may create or modify media files using one or more content creation programs (e.g., a movie program like Microsoft Movie Maker® or Apple iMovie®, a slide program like Microsoft PowerPoint®, a drawing/editing program like Microsoft Paint® or Adobe Photoshop®, etc.) that are stored on the computing devices 104 or accessible as web-based applications.

Accordingly, media files created using the computing device 104 may be stored in a media file store 108, which is shown to be included in the memory 106 of the computing device 104. In addition to the media files themselves, the media file store 108 may maintain metadata associated with media files, such as timestamp information indicating when a media file was created, captured, or modified, geolocation information pertaining to a geographical location where a media file was created, tags that describe people included in or otherwise associated with the media file, properties of the media file (e.g., in the context of images/video—resolution, contrast, aspect ratio, frame rate, etc.), user interaction data indicating the extent and type of past interactions between the media files and the users 102 with access to the media files, and similar metadata.

The computing devices 104 are shown in FIG. 1 as including one or more processors 110 that may be configured to execute instructions, applications, or programs stored in the memory 106, such as the media application 112, which is generally configured to provide viewing, editing, managing, and interaction functions with respect to the media files stored in the media file store 108. For example, a user 102(1) may launch the media application 112 (e.g., an image viewer/editing application) on the computing device 104(1) by providing user input (e.g., touch input) to the computing device 104(1) requesting to open the media application 112 (e.g., touching an icon representative of the media application 112). The media application 112 may be a native application that is integrated in the operating system of the computing device 104, a standalone, aftermarket application downloaded to the computing device 104, a browser of the computing device 104 executing a web-based application, or the like.

The computing devices 104 may be implemented as any type of computing device including, but not limited to, personal computers, laptop computers, tablet computers, portable digital assistances (PDAs), mobile phones (e.g., smart phones), digital cameras, wearable computers (e.g., smart watches, apparel cameras, etc.), set-top boxes (STBs), game consoles, electronic book readers, and so forth. When implemented as a mobile device, such as a smart phone or wearable computer, the computing device 104 may include various components catered to the portable nature of the computing device 104, such as components including, but not limited to, a location determining system such as a global positioning system (GPS) receiver, an inertial measurement unit (IMU) including gyroscopes, accelerometers, magnetometers or compasses, or any other suitable motion sensor including cameras or three-dimensional (3D) sensors configured used for feature tracking, and so on. Furthermore, the computing device 104 may include a graphics processing unit (GPU) or other processor configured to process image data, which may include, for example, determining focal distance of a camera of the computing device 104, facial recognition, and the like. Other input devices (e.g., pointing devices, remote controls, touch screens, microphones, etc.) and output devices (e.g., speakers, display, tactile feedback mechanisms, etc.) are contemplated for the computing device 104.

In some embodiments, the memory 106 of the computing devices 104 may further include a user data store 114 for storing user profiles of the users 102 who operate the computing devices 104, as well as contacts of those users 102, calendars, and other user-specific information. In this scenario, the users 102 may each be able to log/sign into respective user profiles so that the identity of each user 102 may be determined by the computing device 104. In some scenarios, a computing device 104 may be associated with a single user, while in other scenarios a plurality of users may have access to the computing device 104. In some embodiments, a default user profile may be invoked upon a user 102 starting up, or otherwise operating, the computing device 104. Moreover, the user profiles may represent individual ones of the users 102 and/or groups of users 102. For example, a shared, family computing device 104 may store a "family" profile for a group of users 102 comprising, for example, a mother, father, son, and daughter. The contacts maintained in the user data store 114 may be associated with corresponding contact information, such as one or more phone numbers, electronic mail (email) addresses, social networking account names, etc. Calendar data in the user data store 114 may keep track of events, such as birthdays, anniversaries, holidays, and other similar events. The events in the calendar data may be specific to a given user 102(1) or generalized events applicable to all users 102.

In general, the computing device 104 may include a network interface for accessing remote computing resources over a network 116. The network 116 may represent any one or combination of multiple different types of wired and/or wireless networks, such as cable networks, the Internet, local area networks, mobile telephone networks, wide area networks, or a combination of such networks.

FIG. 1 illustrates multiple remote computing resources accessible by the computing devices 104, including one or more cloud storage services 118 (or file hosting services)

configured to enable storing, accessing, and otherwise managing media files "in the cloud," among other services provided by the cloud storage service(s) 118. One illustrative cloud storage service 118 that is suitable for use with the embodiments disclosed herein is OneDrive™, commercially available from Microsoft® Corporation of Redmond, Wash. Other examples of suitable cloud storage services 118 include, without limitation, Google Drive® commercially available from Google® Inc. of Mountain View, Calif., iCloud® commercially available from Apple® Inc. of Cupertino, Calif., and the like. The users 102 may access the cloud storage service(s) 118 via the computing devices 104 over the network 116.

The cloud storage service(s) 118 may be implemented as one or more servers 120(1), 120(2) . . . , 120(Q) (collectively 120), perhaps arranged in a cluster or as a server farm, to host various services relating to media files of the users 102. Other server architectures may also be used for the cloud storage service(s) 118. In the illustrated implementation, the server(s) 120 are shown to include one or more processors 122 and one or more forms of computer-readable media 124. The server(s) 120 may also include additional data storage devices (removable and/or non-removable) such as, for example, magnetic disks, optical disks, or tape. Such additional storage may include removable storage and/or non-removable storage. Computer-readable media 124 may include, at least, two types of computer-readable media 124, namely computer storage media and communication media. Computer storage media may include volatile and non-volatile, removable, and non-removable media implemented in any method or technology for storage of information, such as computer readable instructions, data structures, program modules, or other data. Computer storage media includes, but is not limited to, random access memory (RAM), read-only memory (ROM), erasable programmable read-only memory (EEPROM), flash memory or other memory technology, compact disc read-only memory (CD-ROM), digital versatile disks (DVD), or other optical storage, magnetic cassettes, magnetic tape, magnetic disk storage or other magnetic storage devices, or any other non-transmission medium that may be used to store the desired information and which may be accessed by the server(s) 120. Any such computer storage media may be part of the server(s) 120. Moreover, the computer-readable media 124 may include computer-executable instructions that, when executed by the processor(s) 122, perform various functions and/or operations described herein.

In contrast, communication media embody computer-readable instructions, data structures, program modules, or other data in a modulated data signal, such as a carrier wave, or other transmission mechanism. As defined herein, computer storage media does not include communication media.

Examples of hardware processors include, without limitation, a hardware central processing unit (CPU), a field programmable gate array (FPGA), a complex programmable logic device (CPLD), an application specific integrated circuit (ASIC), a system-on-chip (SoC), and the like.

In some embodiments, the computer-readable media 124 maintains media files within a cloud-based media file store 126. In general, data synchronization may occur between the computing devices 104 and the cloud storage service(s) 118 such that media files that are added to the local media file store 108 get replicated in the cloud-based media file store 126 to persist a personal media file collection between the local media file store 108 and the cloud-based media file store 126 to maintain consistency between the multiple storage locations. The data synchronization process may occur "in the background," such as periodically, when network availability and bandwidth allow for synchronization to occur. In addition, the data synchronization may be one-way or two-way synchronization between the cloud storage service(s) 118 and the computing devices 104. In this manner, the media file collection stored in the local media file store 108 may overlap with the media file collection stored in the cloud-based media file store 126, but they may not be identical collections at all times. For example, when a user 102(1) adds one or more new media files to the local media file store 108, and at a time before the aforementioned synchronization occurs, the newly added media file(s) would not be replicated in the cloud-based media file store 126. However, once the synchronization occurs, the newly added media file(s) may be replicated to the cloud-based media file store 126. The user 102(1) may alternatively delete one or more media files in the local media file store 108 such that, before synchronization occurs, the deleted media file(s) may be stored in the cloud-based media file store 124, but not in the local media file store 108.

Metadata may be associated with the media files in the cloud-based media file store 126 in the same, or at least similar, manner to that described above with reference to the metadata maintained on the client computing devices 104. Moreover, this metadata may generally be synchronized between the cloud storage service(s) 118 and the computing devices 104 in the same manner that the media files may be synchronized between the multiple storage locations. In this manner, the media files and/or their associated metadata may be replicated between the computing devices 104 and the cloud storage service(s) 118 in an ongoing manner as part of a background synchronization process to ensure that the media files and associated metadata are kept up-to-date in a consistent manner between the multiple storage locations.

The computer-readable media 124 may further include a user account store 128 that maintains a plurality of user accounts associated with the users 102 so that each of the users 102 may be identified and allocated a portion of the storage space available in the cloud-based media file store 126. The user account store 128 may include user authentication information (e.g., user name and password), so that the users 102 may log/sign into her respective user account when she desires to view or otherwise manage the media files stored in the media file store 126. For example, a user 102 may point a web browser on the computing device 104 to a web address of the cloud storage service(s) 118 to view/manage their personal collection of media files stored in the media file store 126.

In some embodiments, the users 102 may periodically share or post media files to the one or more media file sharing services 130, which may be implemented as one or more servers 132(1), 132(2) . . . , 132(R) (collectively 132), perhaps arranged in a cluster or as a server farm, to host media file sharing sites (e.g., social networking sites) for media files that the users 102 desire to share. The media file sharing service(s) 130 may represent a social networking service (e.g., Facebook®, Twitter®, etc.) or any other type of file sharing service (e.g., Flickr®, SmugMug®, Dropbox®, etc.) where the users 102, as a community, may share or otherwise post media files to the media file sharing service(s) 130, which maintains shared media files in a media file store 134 in association with user/social profiles of the users 102. The community of the users 102 that have user/social profiles with the media file sharing service(s) 130 may interact with the media files posted from the community by, for example, "liking" media files, commenting on media files, tagging people in the shared media files, re-sharing media files posted by other users 102, and so on. The media file sharing service(s) 130 may track social interactions of users 102 with the media files in the media file store 134. For example, when the user 102(1) "likes" a digital image shared by another user 102(M), that "like" may get associated with the digital image on the media file sharing service(s) 130.

The computer-readable media 124 may further include a social graph store 136 for maintaining social graph data obtained from the media file sharing service(s) 130. Social graph data may pertain to the connections or relationship information established for any given user 102 on the media file sharing service(s) 130. For example, connections in the social graph data may represent explicit social connections, such as "friends" of the user 102 specified on the media file sharing service(s) 130. Connections may be hierarchical in nature to specify varying levels of connectedness, such as friends, family, coworkers, etc. For example, one hierarchical class of entities may comprise family of a given user 102(1), while a next level hierarchical class of entities may include friends of the user 102(1), and so on, including broader hierarchical classes for co-workers, business entities (e.g., corporations with corporate social profiles), and the like. In this manner, the social graph data maintained in the social graph store 136 may define how various entities on the media file sharing service(s) 130 are connected to a given user 102(1) in terms of the degree of separation between the user 102(1) and the individual entities to which she is connected.

In some embodiments, the social graph data maintained in the social graph store 136 may include other implicit connections derived from a user's interactions on the media file sharing service(s) 130 and/or the computing devices 104. For example, other users 102 that a user 102(1) interacts with on the media file sharing service(s) 130, such as writing to the other users' 102 walls, interacting with media files shared by the other users 102, and so on, may be considered as implicit "connections" despite a lack of an explicit connection, such as a "friend" relationship. As another example, information regarding contacts in the user data store 114 that the user has emailed, called, texted, or otherwise communicated with in the past may be imported to the social graph store 136 and used for establishing implicit connections between users. In this manner, any given user 102 may be connected in a variety of different ways to other users 102 in the community of users 102, and these connections may be represented in the social graph store 136.

The computer-readable media 124 may further include a media curation engine 138 that is configured to curate a set of media files for a user 102(1) based on a location of a client computing device 104(1) associated with the user 102(1). Accordingly, the media curation engine 138 may include a location module 140 configured to determine a location of the client computing device 104(1) associated with the user 102(1). In some instances, the location of the client computing device 104(1) that is determined by the location module 140 may represent a location where a media file was created using the client computing device 104(1), such as where a picture was taken using a camera of a smart phone. In other instances, the location module 140 may determine a location of the client computing device 104(1) without the client computing device 104(1) having been used to create a media file. Thus, a variety of techniques may be used to determine the location of the client computing device 104(1).

In one illustrative example, the client computing device 104(1) may periodically "check-in" with the location module 140 by transmitting location data to the cloud storage service(s) 118 indicating the location of the client computing device 104(1). The client computing device 104(1) may transmit location data at regular intervals of times, such as every few seconds, minutes, hours, or another suitable interval. Additionally, or alternatively, the client computing device 104(1) may transmit location data upon detecting movement from motion sensors (e.g., an IMU, GPS receiver, etc.) of the client computing device 104(1). In this manner, the client computing device 104(1) may refrain from repeatedly transmitting the same location data when the device 104(1) is not moving in an effort to conserve resources (e.g., battery, processing capacity, etc.) of the client computing device 104(1).

The location data transmitted by the client computing device 104(1) may be coordinate data (e.g., latitude and longitude) provided by the GPS receiver of the client computing device 104(1), or any other suitable location data, and the location module 140 may, in some instances, implement reverse geocoding to convert the received location data to a readable address (e.g., a street address) or place name. As mentioned above, the aforementioned location data may be transmitted without the client computing device 104(1) having created any media files at the location.

In some embodiments, other mechanisms to deduce the location of the client computing device 104(1) may be leveraged, such as deducing location of the client computing device 104(1) based on the transmission network available to the client device 104(1) and/or known locations of wireless access points or cellular towers and received signal strength at the client computing device 104(1). For example, triangulation based on cell towers in the vicinity of the client computing device 104(1) may be used to locate the client computing device 104(1). As another example, analysis of ambient signals (WiFi, AM/FM, etc.) from wireless transmission sources may enable localization of the client device 104(1). In some instances, a network signal may be entirely unavailable to the client computing device 104(1), in which case the location module 140 may consult other data sources, such as the user data store 114 to access calendar information to determine if there are any events scheduled for the user with a specified location. The specified location in a calendar event for the user 102 may be designated as the location of the client computing device 104(1) in this scenario.

In another illustrative example, a user 102(1) may operate the client device 104(1) to create a media file at a location, such as by using the camera of the client device 104(1) to take a picture at the location. Thereafter, metadata associated with the created media file may be transmitted to the location module 140 for localization purposes. The metadata may include location data such as a geotag or a GPS coordinate encoded in the media file that may indicate the location of the client computing device 104 at a time when the media file was created. The location data associated with a created media file may be transmitted alone or together with the created media file over the network 116 depending on the type of bandwidth available to the client computing device 104. For example, when the client computing device 104 is roaming, or otherwise on a metered network where data transmission/reception is financially costly to the user 102, the location data may be transmitted without transmitting the media file. However, when free or low cost bandwidth is available, the media file may be uploaded to the cloud storage service(s) 118 with the location data, and perhaps other metadata.

It is to be appreciated that the media curation engine 138 may first obtain user authorization to obtain the user's location and other data that is generally personal to the user 102. For example, the user 102 may consent via an on-screen prompt on the client computing device 104, or via an end-user license agreement associated with the media curation engine 138, to allow the service to obtain location data about the user 102 from the client computing device 104. That is, the user 102 may "opt-in" before location and other data personal to the user 102 is obtained. The user 102 may deny consent if the user 102 does not want location and other personal data collected, however, the user 102 is to be notified of relevant media files from social connections in exchange for allowing access to his location. Any personal data collected by the cloud storage service(s) 118 is to be maintained in a secure manner so that other users 102 do not have access to the data.

When the user 102 creates a media file at a location using the client computing device 104, other pertinent data may be collected or otherwise generated. The other pertinent data may include, without limitation, timestamp information indicating a time (e.g., time and day) at which the media file was created, people or objects included in or otherwise associated with the media file (e.g., based on image analysis of an image file, or based on tags added by the user 102), keywords or other text-based tags added to the media file by the user 102, direction or orientation of the client device 104 when the media file was created (e.g., based on compass data, image analysis, etc.), other measurable properties of the media file (e.g., in the context of images/video—focal distance, resolution, contrast, aspect ratio, frame rate, etc.), and similar data. An analyzer 142 may be provided to determine the aforementioned data, and the analyzer 142 may therefore be configured to perform tasks such as media file analysis (e.g., image analysis, audio analysis, etc.) for obtaining some or all of the aforementioned data.

As will be described below, the media curation engine 138 and some or all of the subcomponents of the media curation engine 138, including the analyzer 142, may reside on the client computing device 104 or the cloud storage service(s) 118. Accordingly, the analyzer 142 may be implemented on the client computing device 104 for obtaining some or all of the aforementioned data when it is feasible to do so on the client device 104. For example, less battery or processing intensive tasks may be performed on the client device 104 to be mindful of draining precious resources of the client computing device 104, while other more costly tasks (i.e., complex image analysis tasks) in terms of power and processing cost may be implemented in the cloud storage service(s) 118. In some instances, the client device 104 may perform analysis that is sufficient for making a "best guess" determination of information such as direction. In any case, the analyzer 142 may be configured to determine any other data that is useful in the curation of media files, such as time data (e.g., a current time such as current day and/or time of day, or a time when a media file was created, etc.), or any of the other data previously mentioned.

In some embodiments, the analyzer 142 may be further configured to make an inference about an experience from the available data, including the location of the client computing device 104. For example, if the location is determined to be latitude and longitude coordinates where the Pyramids are located in Giza, Egypt, further analysis may not be needed in order to deduce that the user 102 is likely visiting the Pyramids in Egypt. However, if the location is determined to be latitude and longitude coordinates near Seattle Center in Seattle, Wash., the analyzer 142 may perform further analysis on a created media file at the location to infer an experience. For example, if a picture is taken by the client computing device 104 in Seattle Center, the analyzer 142 may perform image analysis on the image file to recognize an object such as the Space Needle in the picture so that it may be inferred that the user 102 is visiting the Space Needle. Other data, such as direction data, may be utilized in a similar fashion to determine where a camera of the client device was pointed while at a location. Thus, the extent, and perhaps the type, of analysis performed by the analyzer 142 may vary depending on the determined location of the client computing device 104.

The media curation engine 138 may further include a uniqueness module 144 configured to determine whether a day or a location is "unique" to the user in some fashion. In one example, when the location module 140 determines the location of the client computing device 104 without the device having been used to create a media file at the location, the day that is subjected to the uniqueness determination may be the current day. In this scenario, the uniqueness module 144 may determine whether a current day or the location of the client computing device 104 is unique. As described in more detail below, uniqueness may be an absolute term in the sense that something is unique or it is not, in a binary sense. Additionally, uniqueness may be a relative metric that indicates a degree of uniqueness.

In another example, when the client computing device 104 has been used to create a media file (e.g., take a picture), the day that is subjected to the uniqueness determination may be the day that the media file was created, which may be the current day in real-time implementation. However, in some instances, such as when the user 102 takes a picture with a digital camera and later connects the digital camera to a personal computer to import the picture to the personal computer, the day that the picture was taken may be in the past, and the uniqueness module 144 may obtain such information from the analyzer 142 (e.g., by analyzing timestamp data of the picture). In this example, the location of the client device 104 (i.e., the digital camera) may be the location of the digital camera when the picture was taken. In this scenario, when the picture was taken some time in the past, the location of the client device 104 comprises a past location of the client device 104; specifically, the location where the picture was taken. In other words, the day may comprise the current day or a day in the past (e.g., a day when a media file was created), and the location may be a current location of the client device or a past location of the client device (e.g., a location where a media file was created).

The given day or the particular location may be deemed "unique" by the uniqueness module 144 if the day or location is somehow unusual or otherwise not typical with respect to the user 102. Determining the "uniqueness" of the given day or the particular location may be based on one or more criteria used for quantifying or otherwise evaluating uniqueness of the day or location. The one or more criteria provide a quantifiable scheme for definitively determining whether the day or location is unique. Moreover, determining the uniqueness of the day or location allows for selectively notifying the user 102 of curated media files by notifying the user 102 on noteworthy occasions, and refraining from notifying the user 102 on otherwise typical or usual occasions.

Example criteria for determining whether the location is unique include, without limitation, whether the location is a threshold distance from the user's residence/home or place of employment, whether the location is associated with a famous or popular landmark, whether the location is a place where media files are frequently created (e.g., above a predetermined number of media files created per day, week, etc.) by many users 102 (e.g., above a predetermined number of users 102 that create media files every day, week, etc.), whether the user 102 infrequently visits the location (e.g., below a predetermined number of visits per week, month, year, etc.), whether the user 102 has created fewer than a predetermined number of media files at the location, whether the location, on a particular day, is associated with an event taking place at the location on the particular day, and similar criteria that, if satisfied, may indicate that the location is interesting and/or noteworthy to the user 102 such that the user 102 would find it useful to see other media files created at that location from their social connections.

As one illustrative example, consider a user 102(1) who lives in Seattle, Wash. A client computing device 104(1) associated with the user 102(1) may recognize through various means (e.g., tracking user movement patterns, explicit user input, etc.) that Seattle, Wash. (and perhaps a specific street address) is the user's home or place of residence. When the user 102(1) decides to take a vacation to the Pyramids in Egypt, the user 102(1) takes his client computing device 104(1) (e.g., a smart phone) with him. Upon arrival, the location module 140 may detect that the client computing device 104(1) is located at latitude and longitude coordinates corresponding to the Pyramids in Giza, Egypt. The uniqueness module 144 may determine that this location is unique because the location satisfies the criterion of being beyond a threshold distance from home (i.e., Seattle, Wash.), and it is a location infrequently visited by the user 102(1). In addition, the uniqueness module 144 may determine that the location satisfies other uniqueness criteria, such as being a location associated with a famous or popular landmark (e.g., the Pyramids), a location where media files are frequently created by many users 102, and/or a location where the user 102(1) has created fewer than a predetermined number of media files. Any one or combination of criteria may be utilized for determining whether the location is unique to the user 102(1).

By contrast, consider another example scenario where the same user 102(1) whose home is Seattle, Wash. visits the Space Needle, a popular tourist location and a famous landmark. Upon arrival, the location module 140 may detect that the client computing device 104(1) is located at latitude and longitude coordinates corresponding to the Space Needle in Seattle, Wash. The uniqueness module 144 may determine that this location is not unique because the location fails to satisfy particular criteria, such as the location being beyond a threshold distance from home (i.e., Seattle, Wash. is the user's home), and the user frequently visits the Space Needle (i.e., does not satisfy a criteria for the infrequency of visiting the location), and so on. In some cases, the location may satisfy one or more criteria such as the location being associated with a famous or popular landmark (e.g., the Space Needle), yet the uniqueness module 144 determines that a level of uniqueness is not met to make a determination that the location is unique. Determining a level of uniqueness is discussed in more detail with reference to FIG. 2, below. In some embodiments, the uniqueness module 144 may determine that, on a particular day, the location satisfies one or more criteria that make the location unique on that particular day even though the same location may not be considered unique on any other day. For example, on a particular day, an event may be associated with the location (e.g., a music festival taking place at the location). If such a criterion is satisfied, the uniqueness module 144 may determine that the location is unique.

In some embodiments, the uniqueness module 144 may determine a level of uniqueness of the location by determining a total number of criteria that are satisfied. In this sense, different degrees of uniqueness may be determined on a spectrum of uniqueness. Continuing with the "Pyramids" example, if the location of the client computing device 104(1) satisfies four out of six criteria, this location may be considered to have a higher level of uniqueness as compared to a location that satisfies two out of the same six criteria. In this manner, locations may be compared in terms of their uniqueness to the user 102(1).

In a similar manner to determining whether the location is unique, the uniqueness module 144 may be configured to evaluate one or more criteria in order to determine uniqueness of the day. In order to evaluate the one or more criteria, the uniqueness module 144 may be configured to consult a calendar in the user data store 144, or a similar event-based data source, to compare the day to event information associated with that day. In some embodiments, the uniqueness module 144 may rely on other types of data to determine the uniqueness of the day, such as data from image analysis of a photo or video created at the location using the client computing device 104(1), location data (e.g., GPS data) of other client devices 104 at the location, and so on. Example criteria for determining whether a day is unique include, without limitation, whether the day falls on a birthday or anniversary of the user 102(1), a birthday a family member of the user 102(1), or a birthday of close friend of the user 102(1), whether the day is a national holiday, whether the user 102(1) has scheduled a planned event that infrequently occurs (below a threshold number of times a month, year, etc.) or a planned event that is a first time occurrence, whether an entity having a social connection to the user 102(1) appears in a media file created by the user 102(1) while at a location and/or whether the entity is otherwise determined to be collocated with the user 102(1) at the location (e.g., by detecting a location of the entity's computing device 104), and similar criteria that, if satisfied, may indicate that the day is interesting and noteworthy to the user 102 such that the user 102 would find it useful to see other media files created at a location from social connections on that day in the past.

As one illustrative example, consider a user 102(1) with a client device 104(1) who is currently located at their home in Seattle, Wash. The current day is also the user's daughter's birthday. The uniqueness module 144 may determine that the current day is unique because the current day satisfies the criterion of being a birthday of a family member of the user 102(1), which the uniqueness module 144 may have determined from calendar data in the user data store 114. The day may satisfy other criteria as well, such as being the user's wedding anniversary, or other similar criteria that may signify a unique event that is not typical in the sense that it occurs infrequently (e.g., once a year). In another example, the location may be an otherwise ordinary (i.e., not unique) location (e.g., the user's home), and the day may not be associated with a particular event, but the uniqueness module 144 may nevertheless determine that a friend of the user 102(1) is at the location with the user 102(1), which makes the day unique by satisfying a criterion that an entity having a social connection to the user 102(1) is at the location with the user 102(1). In this scenario, the user 102(1) may be at home on a Saturday in July, but his friends are over for a barbecue, so the day "becomes" unique by virtue of the people that the user 102(1) is with on that day.

As another example, consider a user 102(1) at work (i.e., not a unique location) on a Monday, but his child is with him at work (e.g., "Take Your Child to Work Day"), which makes the day unique because the child is an entity having a social connection to the user 102(1) and is collocated with the user 102(1) on that day. In this manner, any one or combination of criteria may be utilized for determining whether the day is unique to the user 102(1).

In some embodiments, an entity having a social connection to the user 102(1) may be determined to be collocated with the user 102(1) based on visual analysis (e.g., image analysis such as facial recognition to detect a face of the entity) of an image or video file created by the user 102(1) at the location, by location data (e.g., GPS data) regarding the entity that may be obtained from a client device 104 associated with the entity, by a "check-in" event, or any other type of location-based service used to determine that the entity is collocated with the user 102(1), thereby making the day unique.

In some embodiments, the uniqueness module 144 may determine a level of uniqueness of the day by determining a total number of criteria that are satisfied. Returning to the "daughter's birthday" example, if the current day satisfies two out of four criteria, this day may be considered to have a higher level of uniqueness as compared to a location that satisfies one out of the same four criteria.

In some examples, in order to trigger a media curation process, described in more detail below, it may be sufficient to find either the day or the location to be unique. However, it is quite possible for both the day and the location to be unique, in which case, an overall uniqueness level of a situation/experience may be determined based on the uniqueness of both the day and the location.

The media curation engine 138 may further include a query module 146 configured to query or search the media file sharing service(s) 130 to identify shared media files that were created at, or near, the location of the client computing device 104(1). In some embodiments, the query module 146 may initiate a query in response to the determination that the day or location is unique, but may otherwise refrain from initiating a query if neither the day nor the location is determined to be unique. The shared media files that are identified by the query module 146 may be associated with one or more entities having social connections to the user 102(1). In this manner, the identified media files are relevant to the user 102(1) in that the user 102(1) recognizes the one or more entities as familiar acquaintances (e.g., friends, family, coworkers, etc.). The identified media files are also relevant to the user 102(1) in that the media files were also created at, or near, the location that the user 102(1) visited with his client device 104(1). Shared media files created "at the location" may comprise shared media files that were created at least geographically proximate (e.g., within a threshold distance) of the location. The location where the shared media files were created may be determined or deduced in a variety of ways, such as by analyzing metadata (e.g., geotags) associated with the shared media files, text analysis of text associated with the shared media files (e.g., album titles, keywords, tags, comments, etc.), image analysis techniques to recognize objects to infer location, and so on.

In some embodiments, the shared media files are identified based on other information about a media file that was created by the client computing device 104(1) of the user 102(1) at the location. For example, direction information associated with a locally-created media file using the client device 104(1) may be accessed and utilized to identify shared media files that were not only created at the location, but were pointing in the same, or a similar, direction as a camera of the client device 104(1). To illustrate, a user 102(1) at the Pyramids may take a picture of a particular pyramid from a particular vantage point (direction), and the query module 146 may identify shared pictures of the particular pyramid that were taken from the same, or a similar, vantage point (direction). If the query module 146 is not able to identify shared media files (e.g., photos) that were taken from the same direction as the media file created by the user 102(1), the query module 146 may "fall back" to identifying media files that were created at the location, regardless of direction similarities.

It is to be appreciated that the media curation engine 138 may first obtain user authorization or consent to access a user's social profile for the purposes of identifying social connections of the user 102(1) on the media file sharing service(s) 130. For example, the user 102(1) may consent via an on-screen prompt on the client computing device 104, or via an end-user license agreement associated with the media curation engine 138, to allow the service to obtain social connection information and store the information in the social graph store 136 where it is to be maintained in a secure manner so that other users 102 do not have access to the information. In this sense, the user 102 may "opt-in" before social connection information and other data personal to the user 102 is obtained. The user 102 may deny consent if the user 102 does not want personal data collected from the media file sharing service(s) 130, however, the user 102 is to be notified of relevant media files from social connections in exchange for allowing access to his social information. The user 102 may access his information maintained in the social graph store 136 to view the data that has been collected about them and to provide corrections to it. For example, a web-portal or another secure interface may be accessible to the user of the media curation engine 138 for viewing and editing collected personal information.

In order to search for relevant media files, the query module 146 may access an application programming interface (API) for querying the media file sharing service(s) 130 to search the repository of media files in the media file store 134. If relevant media files are identified by the query module 146, the identified media files may be pulled to the cloud storage service(s) 118. In some embodiments, the query module 146 may be configured to utilize one or more search engines 148, which may be implemented as one or more servers 150(1), 150(2) ..., 150(T) (collectively 150), perhaps arranged in a cluster or as a server farm, in order to search for images shared to the media file sharing service(s) 130 that have been indexed by the search engine(s) 148 in the link data 152. Specifically, the search engine(s) 148 may index publicly shared media files that are searchable using the search engine(s) 148. In this manner, the query module 146 may augment a query via searching through the search engine(s) 148, or may use the search engine(s) 148 as a first order searching mechanism for shared files.

The shared media files that are identified as being relevant to the user 102(1) may be returned as a results set of media files to a curator 154. The curator 154 may curate, or otherwise sift through and select, a subset of the shared media files that it determines to be the "best" subset of media files. The selection of the "best" media files may be based on a number of factors, such as quality metrics (e.g., resolution, color, aesthetic qualities, etc.) associated with media files, diversity indicators to select a diverse set of images that are not too similar looking, age of the media files (e.g., newer media files may be selected over older ones), and/or user interaction characteristics (e.g., how often the user 102(1) has viewed, edited, or otherwise interacted with the media files, or a number of "likes" or comments received by the media files, etc.). Furthermore, a current state of relationship between the user 102(1) and the other users 102 in the community that are associated with the shared media files may be a factor in curating a subset of the media files. For example, media files associated with family and close friends of the user 102(1) may be selected over media files from more distant social connections. Moreover, media files having social connections of the user 102(1) appearing in the media files may be preferentially selected over others that do not.

In some embodiments, the curator 154 may preferentially select media files associated with entities having social connections with the user 102(1) that are "collocated" with the user 102(1) at the same time. For example, a friend of the user 102(1) may be located within a threshold distance of the user 102(1) and may have posted a photo to the media file sharing service(s) 130 within the past few minutes. The curator 154 may be configured to utilize such temporal criteria for selecting photos from friends that are collocated with the user 102(1) so that the user knows that the friend is at the same location at the same time, such as when they are both attending a common event (e.g., a sports game, festival, concert, etc.). Additionally, or alternatively, a friend of the user 102(1) may be determined to be collocated with the user 102(1), which may be determined by recognizing a face of the friend in a picture taken by the user 102(1) at the location. In this scenario, the friend may not even have a computing device 104 with them, but they are determined to be with the user 102(1) at the location at the same time using facial recognition applied to photos or videos created by the user 102(1) at the location. When the friend is in possession of a computing device 104, location data from the friend's computing device 104 may be used to determine that the friend is within a threshold distance of the user 102(1).

The curated set of media files output by the curator 154 may be stored in the media file store 126 as an "implicit" album 156, meaning that the album was not created explicitly by the user 102(1). Instead, the implicit album 156 represents a system-created album that the media curation engine 138 believes the user 102(1) will enjoy. The implicit album 156 is sometimes referred to herein as a "virtual" album for similar reasons.

The media curation engine 138 may further include a user interface module 158 configured to notify the user 102(1) of the implicit album 156 or otherwise cause the presentation of the implicit album 156 on the client computing devices 104. Accordingly, a notification module 160 may cause a notification to be issued to the user (e.g., a push notification) via the client device 104 (e.g., to the media application 112) in order to instruct the media application 112 to alert the user 102(1) of the curated subset of media files stored as the implicit album 156. The notification issued by the notification module 160 may cause the media application 112 to notify the user in the form of a selectable option presented on a user interface (UI) of the client computing device 104, such as, but not limited to, a "toast" notification or other similar pop-up notification. The user 102(1) may also set up email notifications that have selectable links embedded in the emails.

Upon selection of the notification, a media serving component 162 may cause display on the client computing device 104 of at least some of the media files in the implicit album 156. In some embodiments, the notification itself may be in the form of causing display on the client computing device 104 of at least some of the media files in the implicit album 156. This may be suitable for situations where the client device 104(1) is within range of a Wi-Fi network, or a similar free/low cost bandwidth network. Otherwise, the notification may be selected to launch or invoke the media application 112 where the implicit album 156 may be viewed. In scenarios where the client device 104(1) is roaming or on a metered network, the user action of selecting the notification may be taken as implied consent to download the implicit album 156 to the client computing device 104(1). In some instances, the aforementioned background synchronization process may refrain from synchronization until the notification is selected by the user so as to refrain from replicating the implicit album 156 to the client device 104(1) without the user's permission.

When media files in the implicit album 156 are discovered to already exist in a personal collection of media files of the user 102(1) (either in the client-based media file store 108 and/or the cloud-based media file store 126), the media curation engine 138 may run a deduping process to remove duplicate media files as a result of importation of the implicit album 156. Furthermore, the media curation engine 138 may have an "aging out" process where the implicit albums 156 that are not saved or otherwise interacted with by the user 102(1) are deleted after a predetermined amount of time. In this way, storage space of the user 102(1) is not occupied by implicit albums 156 that the user 102(1) does not desire to keep.

A dialogue module 164 may be configured to invoke a communication mechanism between the user 102(1) and any one or more of the entities associated with the media files in the implicit album 156. For example, the dialogue module 164 may cause display on the client computing device 104 of a selectable option (e.g., a UI element) to initiate a call, email, short message service (SMS) text, instant message, video conference, or any other suitable communication mechanism for communicating with the chosen entity. For example, the user 102(1) may see that a close friend took a picture at the Pyramids where the user 102(1) just took a picture, and the user 102(1) may desire to send a text message to her close friend to start a dialogue. For instance, the user 102(1) may want to ask the close friend where a good restaurant is in Giza for a recommendation of a place to eat dinner.

While FIG. 1 illustrates that the media curation engine 138, and the subcomponents therein, is stored on or accessible by the cloud storage service(s) 118, in some instances some or all of these components in the media curation engine 138 may reside on one or more other entities to be executed on the one or more other entities. For instance, some or all of these components in the media curation engine 138 may reside on the computing devices 104 to be executed by the processor(s) 110 in some instances. Furthermore, in some instances, the components shown on the cloud storage service(s) 118 may provide code to the respective computing devices 104 to perform the respective functionality of the component. In this manner, any amount of the workload to implement the media curation engine 138 and its subcomponents may be divided across devices (e.g., divided between the cloud storage service(s) 118 and one or more of the client-side computing devices 104. As an illustrative example, the client computing device 104 may determine uniqueness of the day or location, and may query the media file sharing service 130 directly over the network 116 to identify shared media files based on the location that may be curated in the form of an implicit album 156 either on the client computing device 104 or in the cloud storage service(s) 118.

Example Media Curation

Figure 2:
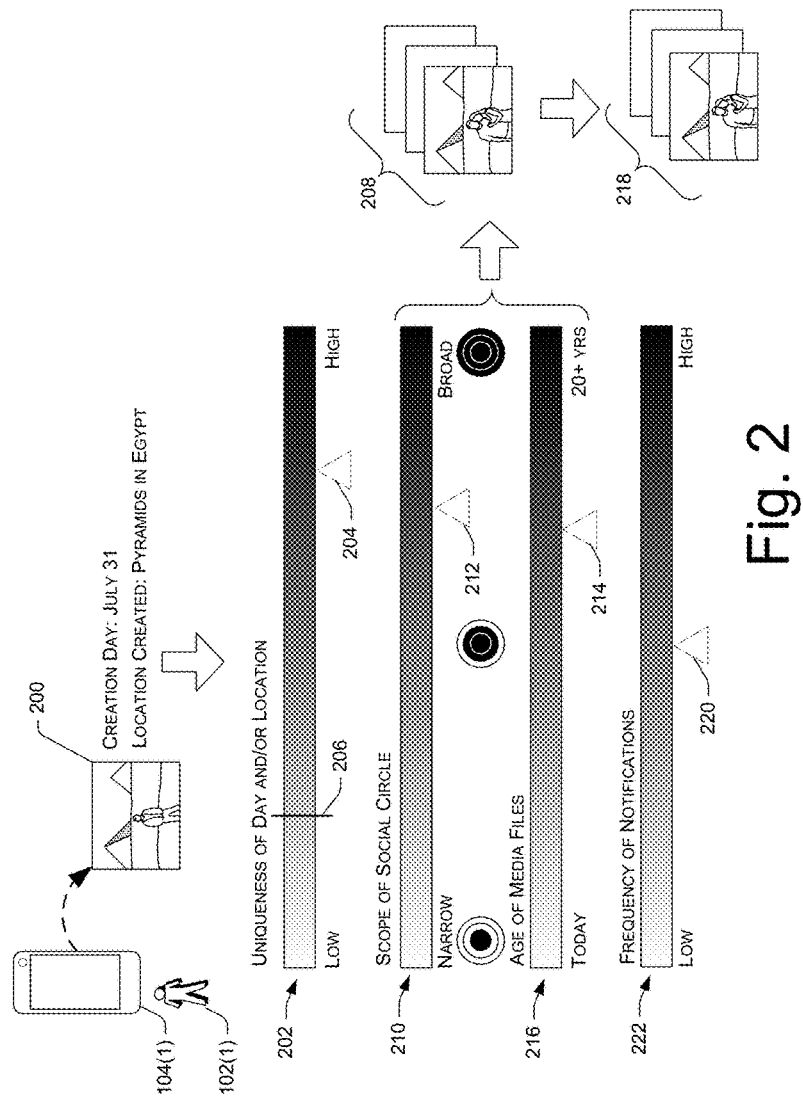
FIG. 2 is a schematic diagram of an example technique for determining uniqueness of a day or a location of a client device, as well as adjusting the scope of a user's social circle and an age of media files for identifying relevant media files, and further adjusting the frequency of notifications received by the user.

FIG. 2 is a schematic diagram of an example technique for determining uniqueness of a day or a location of a client device, such as the client device 104(1), as well as adjusting the scope of a user's social circle and an age of media files for identifying relevant media files. In the example illustrated by FIG. 2, a user 102(1) has traveled to the Pyramids in Egypt for vacation, and upon arrival at the Pyramids, the user 102(1) has created a media file 200 by using a camera of his client computing device 104(1) to take a picture. FIG. 2 also shows that the media file 200 was created on July $31^{st}$ (which may be a current day in real-time implementation scenarios). The location module 140 may have received metadata associated with the media file 200 after it was created to determine the location from raw location data, such as latitude and longitude coordinates. Furthermore, the analyzer 142 may have determined the day of July $31^{st}$ from the transmitted metadata, such as a timestamp of the media file 200. Other data regarding the media file 200 may be obtained or otherwise determined by the analyzer 142, such as a direction of the camera of the client computing device 104(1) when the media file 200 was created, people or objects tagged in the media file, and so on.

It is to be appreciated that, although FIG. 2 illustrates an example where the user 102(1) has created the media file 200, the techniques and systems disclosed herein are not limited to instances where a media file 200 is created at a location. For example, the user 102(1) may have arrived at the Pyramids with his client computing device 104(1) without having taken a picture or otherwise created any media files. In this scenario, a location of the client computing device 104(1) may be determined as the Pyramids in Egypt by, for example, receiving location data transmitted from the client computing device 104(1) over the network 116. Any suitable technique for determining a location of the client computing device 104(1) may be utilized without changing the basic characteristics of the system.

Continuing with the example in FIG. 2, the uniqueness module 144 may be configured to determine whether the day of July $31^{st}$ is unique to the user 102(1), and may also be configured to determine whether the location of the Pyramids is unique to the user 102(1). The uniqueness module 144 may determine if the location of the "Pyramids" satisfies one or more criteria to determine whether the location is unique. FIG. 2 illustrates uniqueness spectrum 202 that represents a visualization of determining a uniqueness level (degrees of uniqueness) in terms of the location, the day, or both. Starting with location, the uniqueness module 144 may determine a uniqueness level 204 for the location of the "Pyramids" based on determining that the location satisfies a number of criteria, such as the location is beyond a threshold distance from the home of the user 102(1), the location is associated with a famous or popular landmark (e.g., the Pyramids), and so on. In general, the more criteria that are satisfied, the higher the uniqueness level 204. In this example, the location of the Pyramids may have satisfied a certain number of a plurality of criteria to receive the uniqueness level 204 shown on the uniqueness spectrum 202.

In some embodiments, a determination that at least one criteria is satisfied may result in a determination, by the uniqueness module 144, that the location is unique. In other embodiments, a uniqueness threshold 206 may be utilized to determine that the location is unique if the uniqueness level 204 meets or exceeds the uniqueness threshold 206. Conversely, if the uniqueness level 204 is below the uniqueness threshold 206, the location may be designated as not unique. In this sense, even when a level or degree of uniqueness may be determined, a threshold uniqueness may allow for implementation of an absolute determination of whether the location and/or the day is unique for purposes of media curation. FIG. 2 illustrates that the uniqueness level 204 exceeds the uniqueness threshold 206 to cause the other components of the media curation engine 138 to identify relevant media files and curate a subset of media files in a virtual album. In the scenario where the uniqueness threshold 206 is not met, or the location fails to satisfy any criteria, the location may be designated as uninteresting or "not unique" such that the media curation engine 138 refrains from identifying relevant files for curating a subset. In this manner, the uniqueness determination may be utilized for selectively notifying the user 102(1) so that the user 102(1) is not notified on uninteresting or typical occasions.

The uniqueness module 144 may further evaluate one or more criteria in order to determine uniqueness of the day July $31^{st}$. To do this, the uniqueness module 144 may be configured to consult a calendar in the user data store 144, or a similar data source, to compare July $31^{st}$ to the calendar information. If one or more criteria are satisfied, the day of July $31^{st}$ may be designated as unique, or it may otherwise contribute to an overall uniqueness level 204 on the spectrum 202. For example, if July $31^{st}$ is the user's birthday, the uniqueness level 204 may increase. For purposes of illustration, July $31^{st}$ is not determined to be unique in the example of FIG. 2. However, since the location of the "Pyramids" has been designated as unique, the media curation engine 138 may invoke the query module 146 to identify shared media files that were created at the location (i.e., created within a threshold distance of the location of the client computing device 104(1)).

As described above, the query module 146 may be configured to query or search the media file sharing service(s) 130 to identify shared media files 208 that were created at, or near, the location of the client computing device 104(1). The shared media files 208 that are identified may be associated with one or more entities having social connections to the user 102(1). In this manner, the shared media files 208 are relevant to the user 102(1) in that the user 102(1) recognizes the one or more entities. However, in order to provide the most relevant shared media files 208, the query module 146 may select a hierarchical class of entities, or a scope of a social circle, as depicted visually by the social circle spectrum 210. In general, entities having closer social connections to the user 102(1) (e.g., familiar acquaintances like close friends, family, etc.) by being within a particular hierarchical class of entities (e.g., family class, friends class, coworkers class, etc.) are considered more relevant to the user in the sense that the user 102(1) is closer to those entities in a social sense. However, the scope 212 of the social circle that the query module 146 selects may be based on the uniqueness level 204 determined by the uniqueness module 144. In other words, the query module 146 can scale the breadth of the user's social circle based on the uniqueness of the situation. For example, for a highly unique location like the Pyramids, the scope 212 of the social circle may be adjusted to select a broader class of entities. This is based on the notion that it is thought to be less likely that a large number of the user's social connections will have visited a highly unique location and created media files at that highly unique location. Thus, in order to identify relevant media files, the query module 146 may need to look to a broader circle of social connections to find relevant media files. On the other hand, it may be much more likely that a large number of the user's social connections will have visited a less unique location. One example of this scenario may be where the user's home is located in Seattle, Wash., and the location of the client device 104(1) is determined to be the Space Needle. Because many more of the user's social connections will have taken pictures at the Space Needle, the scope 212 of the social circle may be adjusted down on the spectrum 210 to select a hierarchical class of entities that have relatively close relationships to the user 102(1) so that the most relevant media files may be identified as the shared media files 208. In some embodiments, the query module 146 may initially select a narrow scope 212 to determine whether a threshold number of shared media files are identified using the selected scope 212, and if not, broaden the scope 212 until a threshold number of shared media files are identified.

The query module 146 may also select an age 214 of media files, as depicted visually on the age spectrum 216, for identifying the shared media files 208. The age 214 may also be based on the uniqueness level 204 such that the query module 146 can scale the age range to search for media files based on the uniqueness of the situation. For example, when the uniqueness level 204 of the location is relatively high, the query module 146 may look farther back in time to discover shared media files that are relatively older, whereas when the location is less unique, the query module 146 may adjust the age 214 to discover more recently created media files.

With the scope 212 of the social circle and the age 214 of the media files set, the query module 146 may identify the shared media files 208 that were created at, or near, the location of the Pyramids, are associated with one or more entities having social connections that fall within the scope 212, and that are no older than the age 214. The curator 154 may select a subset 218 of the shared media files 208 that represent an implicit album 156, and the user 102(1) may then be notified of the subset 218 via the client computing device 104(1).

The notification module 160 of the media curation engine 138 may also be configured to select a notification frequency 220, as depicted visually on the notification frequency spectrum 222. As will be discussed in more detail below with reference to FIG. 8, the notification module 160 may adjust the frequency of notifications received by the user 102(1) of the subsets 218 curated by the curator 154. This may be based on explicit user settings of a frequency preference, or it may be based on monitoring user interactions with previously served notifications of previously curated subsets (i.e., implicit albums 156). That is, the analyzer 142 may analyze past user interactions (e.g., ignoring notifications, dismissing notifications, providing user input to save and/or view implicit albums 156, and so on) to deduce whether the user's interactions with the notifications are generally positive or generally negative (e.g., by determining whether a frequency of positive interactions meet or exceed a threshold frequency). In general, the frequency of notifications may increase with an increase in observed positive interactions from the user 102(1), and may decrease with an increase in observed negative interactions. In this manner, the notification frequency may be tailored to the individual user 102.

Example User Interfaces (UIs)

Figure 3A:
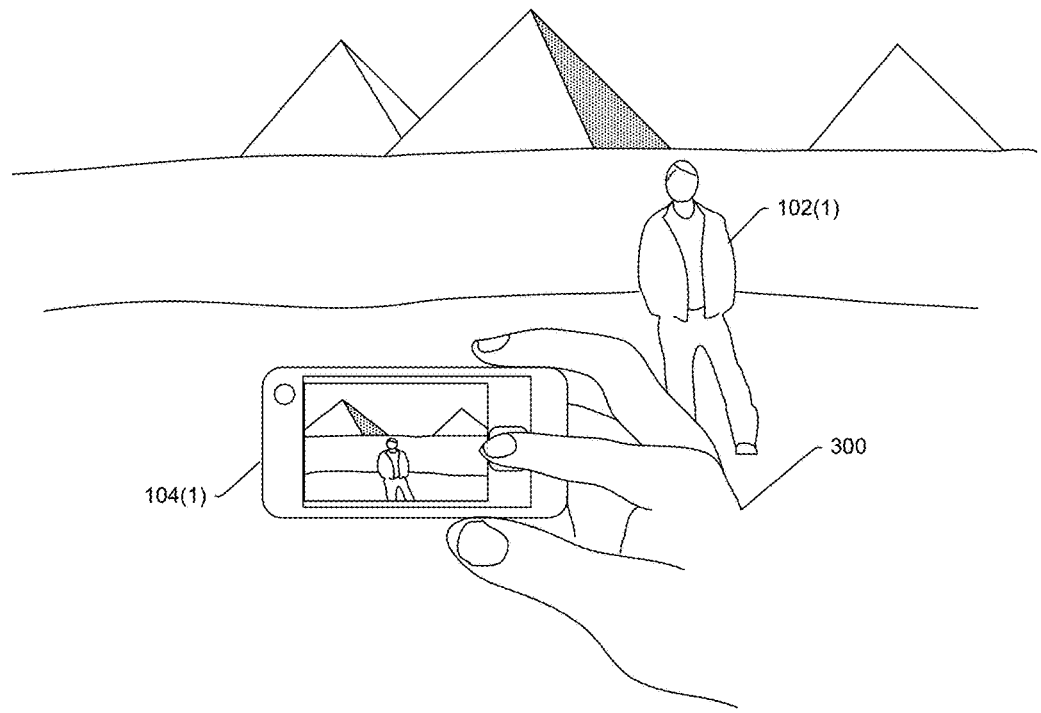
FIG. 3A illustrates a user having his picture taken at the Pyramids in Egypt, the picture being taken with an example client computing device of the user.

FIG. 3A illustrates a user 102(1) having his picture taken at the Pyramids in Egypt. In this example, another individual 300 is shown taking the picture with an example client computing device 104(1) that is associated with the user 102(1). In one example, upon taking the picture with the client computing device 104(1), the media file, such as the media file 200, resulting from the picture is stored on the client computing device 104(1), such as in the memory 106 and accessible via the media application 112. Metadata associated with the media file 200 may also be stored in the memory 106, such as encoded GPS data, time data, and so on.

As described above, the media file 200, or at least metadata associated with the media file 200, may be synchronized to the cloud storage service(s) 118, at which time the location module 140 may determine the location where the media file 200 was created; in this case, the Pyramids in Egypt. In this example, the user may be on a roaming network, or may otherwise be under an obligation to pay extra for voice and/or data usage using the client computing device 104(1), such as a smart phone. In this scenario, the user 102(1) may apply a setting on the computing device 104(1) that does not allow upload of photos or videos when roaming. Accordingly, the synchronization that occurs after the picture is taken may comprise uploading, via the network 116, the metadata associated with the media file 200 (e.g., location data, time data, and/or other metadata) without uploading the actual media file 200 (i.e., without the content). Uploading the metadata without the media file 200 may be relatively inexpensive, and sometimes free, when on a metered network so that the user 102(1) does not have to pay extra for data usage by the client device 104(1). The user 102(1) may configure settings on the client device 104(1) in order to consent to the uploading of metadata during this process. As described above with reference to FIG. 2, at least the location of the "Pyramids" may be deemed unique by the uniqueness module 144, and a curated subset 218 of media files may be selected by the curator 154 based on the location of the client computing device 104(1) and the social connections of the user 102(1).

Figure 3B:
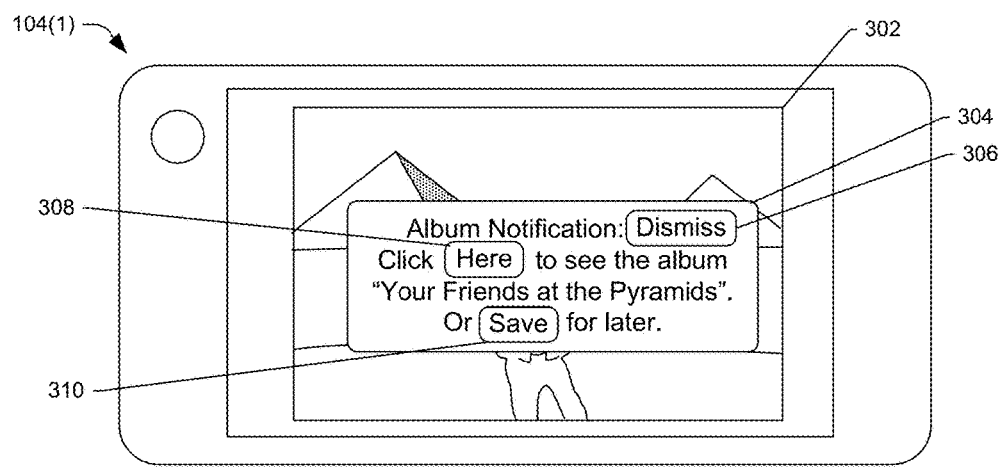
FIG. 3B illustrates the example client computing device of FIG. 3A with a screen rendering of an example user interface (UI) presenting a notification that an album has been created for the user.

FIG. 3B illustrates the example client computing device 104(1) of FIG. 3A with a screen rendering of an example user interface (UI) 302 presenting a notification 304 that an implicit album 156 has been created for the user 102(1). The UI 302 is merely one illustrative example of a suitable manner for presenting the notification 304 in the form of a "toast" pop-up message, and it is appreciated that other forms of presenting the notification 304 may be implemented without changing the basic characteristics of the media curation engine 138. For example, the notification 304 may be presented in the form of a drop down banner at the top of the UI 302, an audible notification (e.g., a chime or alarm), a vibration notification, and so on. In the illustrative example of FIG. 3B, the notification 304 includes an on-screen element with text-based content describing that an album entitled "Your Friends at the Pyramids." The notification 304 may also include one or more selectable options 306, 308, and 310, that the user 102(1) may interact with via user input to the client device 104(1). For example the user 102(1) may provide touch input to the UI 302 by touching a finger, stylus, or other object to the display of the client device 104(1) at the area of the selectable options 306-310. The selectable option 306 may allow the user 102(1) to dismiss the notification 304, or otherwise discard the notification. The media curation engine 138 may track or monitor the interaction, and/or the lack of interaction (i.e., inaction), of the user 102(1) with respect to the notification 304 so that the media curation engine 138 may learn about the user's interest in the notification 304, or the implicit album 156 that has been created. Alternatively, the user 102(1) may ignore the notification 304, which may time-out or otherwise disappear from the UI 302 after a predetermined period of time. An inaction of the user (e.g., ignoring the notification 304) may be registered in the same manner as a selection of the "dismiss" option 306 in that it indicates that the user 102(1) is not interested in viewing the implicit album 156.

The selectable option 308 may, upon selection, direct the user 102(1) to the curated album by launching the media application 112 or otherwise causing presentation of the implicit album 156, as will be described further in relation to FIG. 3C. The selectable option 310 may allow the user 102(1) to "save" the implicit album 156, or at least the notification 304, for later viewing. For example, the notification 304 may disappear from the UI 302 upon the user 102(1) selecting the "save" option 310, but the notification 304 may be added to a list of notifications in the media application 112 on the client device 104(1), such as in a notifications menu of the media application 112, so that the user 102(1) may view a list of saved notifications at a later point in time and choose which ones to select for viewing implicit albums 156 associated with those notifications. Continuing with the "Pyramids" example, the user 102(1) may select the "save" option 310, may continue visiting the Pyramids, and then, upon returning to his hotel, or even his home after the vacation, the user 102(1) may launch the media application 112 to view and select the saved notification 304 in a notifications menu or folder in order to view the curated album entitled "Your Friends at the Pyramids."

Figure 3C:
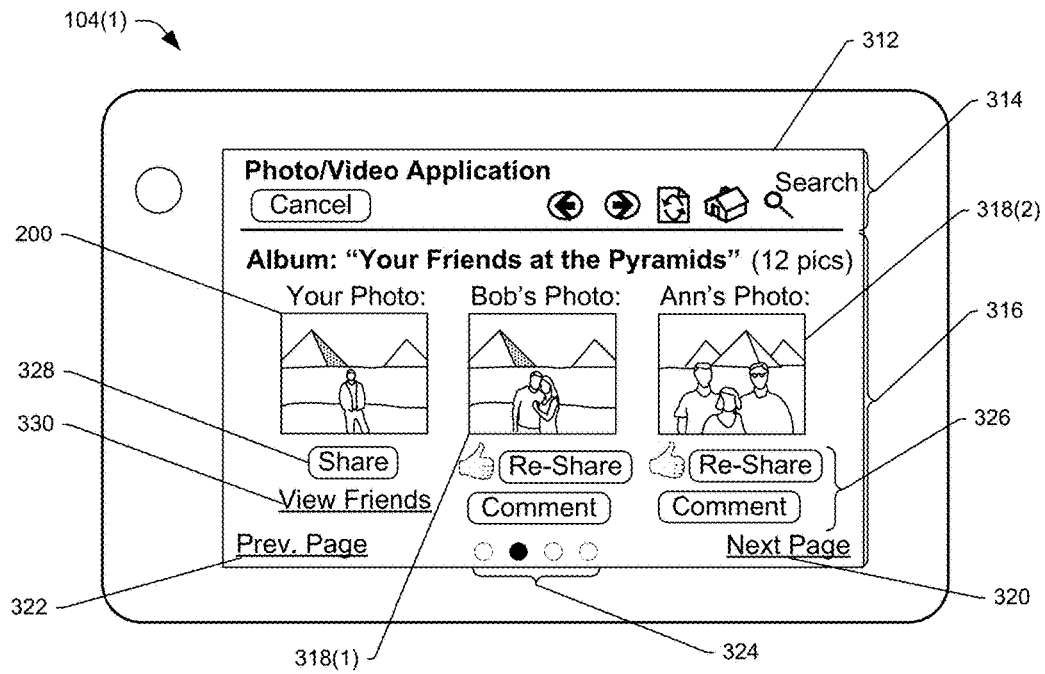
FIG. 3C illustrates the example client computing device of FIGS. 3A and 3B with a screen rendering of another example UI that presents the album upon user selection of the notification shown in FIG. 3B.

FIG. 3C illustrates the example client computing device 104(1) of FIGS. 3A and 3B with a screen rendering of another example UI 312 according to another embodiment that presents the implicit album 156 upon user selection of the notification 304 shown in FIG. 3B. The UI 312 is merely one illustrative example of a suitable manner for presenting the implicit album 156. In the illustrative example of FIG. 3C, the UI 312 includes a header portion 314 that may include navigation tools (e.g., on-screen navigation elements) and a header description to tell the user 102(1) that they are currently executing a "photo/video application," (an example of the media application 112) among other information that may be provided in the header portion 314.

The UI 312 includes in a presentation portion 316 where the media files in the implicit album 156 are presented. The media files in the implicit album 156 may be grouped or organized for presentation in any suitable fashion, such as the most recently created media files presented first, or media files associated with each associated entity having a social connection to the user 102(1) presented in turn, and so. The media files of the implicit album 156 may include the media file 200 (e.g., an image file) that was created by the client device 104(1) while the user 102(1) was at the location shown in FIG. 3A; in this case the Pyramids in Egypt. In scenarios where the user 102(1) did not create a media file at the location, the implicit album 156 would not include the media file 200. The implicit album 156 may also include a subset of media files, such as the media files 318(1) and 318(2), that were identified on the media file sharing service 130 as media files that were taken at the location and associated with entities (e.g., other users 102) having social connections to the user 102(1). For example, the media file 318(1) is an image file of a picture that was taken by Bob, a friend of the user 102(1), while Bob was visiting the Pyramids, and the media file 318(2) is an image file of a picture that was taken by Ann, a sister of the user 102(1), while Ann was visiting the Pyramids.

The query module 146 identified the media files 318(1) and 318(2) as being relevant to the user 102(1) because they were taken at, or at least near, the same location where the media file 200 was created, and the user's social connections (e.g., Bob and Ann) are associated with the media files 318(1) and 318(2) in perhaps multiple respects. For example, both Bob and Ann may have shared the media files 318(1) and 318(2) individually via their user/social profiles on a website of the media file sharing service 130. Additionally, or alternatively, Bob and Ann may be associated with the media files 318(1) and 318(2) by virtue of appearing in the media files 318(1) and 318(2), or being tagged in association with the media files 318(1) and 318(2). In this manner, the user 102(1) may be delighted by the relevant media files 318(1) and 318(2) that are associated with the user's friends and were created at, or near, the same location of the user 102(1).

In some examples, the UI 312 may include a page forward control 320 and a page back control 322 to allow the user 102(1) to browse through the entire implicit album 156 when there are too many media files to present at one time on the UI 312. In this scenario, the UI 312 may include page indicators 324 that indicate the current page being rendered on the UI 312. In the example of FIG. 3C, the implicit album 156 includes twelve image files, and the user 102(1) is currently viewing three of the twelve image files.

Furthermore, FIG. 3C shows that the media files 200, 318(1), and 318(2) are presented in a left-to-right fashion on the UI 312, but this arrangement of the media files is not limiting. For example, the media file 200 may be presented in substantially the middle of the UI 312 and surrounded by the media files 318(1), 318(2), and perhaps other relevant media files in the implicit album 156. A variety of suitable presentation scenarios are envisioned herein, and the presentation schemes are not limited by those shown in FIG. 3C.

The UI 312 may further include interaction elements 326 associated with individual ones of the media files 318(1) and 318(2), such as a selectable buttons that allow the user 102(1) to approve or "like" (or disapprove), re-share, comment, etc., on the individual media files 318(1) and 318(2). These interactions provided by the interaction elements 326 may be implemented in a manner that, upon selection of the interaction elements 326, the user 102(1) is directed to a website or an application of the media file sharing service 130, or the selection may simply be pushed to the media file sharing service 130, such as when the user 102(1) "likes" one of the media files 318(1) or 318(2).

The UI 312 may further include a share button 328 to allow the user 102(1) to share the media file 200 with other users 102, such as via the media file sharing service(s) 130. Upon selection of the share button 328, the user 102(1) may be directed to a website or application of the media file sharing service(s) 130 where the user 102(1) may select other options in regard to sharing the media file 200. Furthermore, the UI 312 may include a selectable option 330 to view a list of entities that are associated with the media files in the implicit album 156, including the media files 318(1) and 318(2).

Figure 3D:
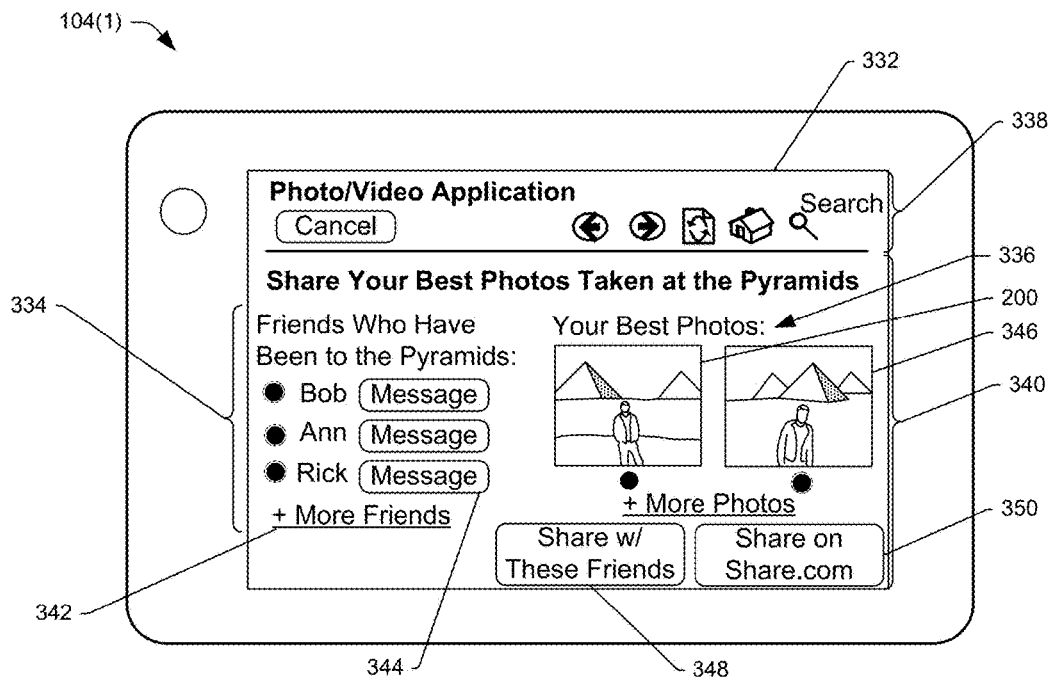
FIG. 3D illustrates the example client computing device of FIGS. 3A-3C with a screen rendering of another example UI that presents a list of entities associated with the media files in the album, and a curated set of media files created with the client computing device at the Pyramids in Egypt.

FIG. 3D illustrates the example client computing device 104(1) of FIGS. 3A-3C with a screen rendering of another example UI 332 that presents a list of entities 334 associated with the media files in the implicit album 156, and another curated set 336 of media files that were created using the client computing device 104(1) while at the Pyramids in Egypt. The UI 332 is merely one illustrative example of a suitable manner for presenting the list of entities 334 and the curated set 336. In the illustrative example of FIG. 3D, the UI 332 includes a header portion 338 that may be similar to, or the same as, the header portion 314 as described with reference to FIG. 3C. The UI 332 may further include in a presentation portion 340 where list of entities 334 and the curated set 336 of media files are presented.

The list of entities 334 may represent entities associated with the media files of the implicit album 156, including the media files 318(1) and 318(2) of FIG. 3C, and the UI 332 with the list of entities 334 may be rendered in response to selection of the selectable option 330 of FIG. 3C to "view friends." Entities in the list 334 may be associated with the media files of the implicit album 156 in various ways. For example, entities in the list 334 may be associated with the media files in the implicit album 156 by having shared the media files 318(1) and/or 318(2) to the media file sharing service(s) 130, by appearing in the media files 200, 318(1), and/or 318(2) of the implicit album 156 (e.g., detectable by tags, facial recognition, etc.), by having been part of an audience that the media files 318(1) and/or 318(2) were shared with, by having commented on, liked, or re-shared the media files 318(1) and/or 318(2), and so on. The user 102(1) may select or deselect individual ones of the entities in the list 334 via on-screen elements such as radio buttons, and the user 102(1) may select an link 342 to show more friends in the list of entities 334 and/or to add more entities having social connections to the user 102(1) that may not be included in the list of entities 334, but whom the user 102(1) desires to share media files with. In this manner, the user 102(1) may customize the default list of entities 334 via selection of individual ones of the entities in the list 334.

The UI 332 may present dialogue options 344 in association with individual ones of the entities on the list 334 for selection by the user 102(1) that will initiate a dialogue with the associated entity in the list 344. For example, upon selection of the dialogue option 344, an SMS text, email, phone call, video conference, or the like may be initiated. The user 102(1) may be presented with these messaging options upon selection of the dialogue option 344 to initiate a communication via the medium of his liking.

The user 102(1) may select or deselect individual media files in the curated set 336 of his own media files for choosing which media files to share. This may be enabled via on-screen elements like radio buttons or similar elements that allow for selecting a customized set of media files. FIG. 3D shows that the media file 200 was selected for inclusion in the curated set 336 along with a different media file 346 that the user 102(1) also created with the client device 104(1) while at the location of the "Pyramids," and perhaps additional media files that the user 102(1) created at the location. The curated set 336 of the user's media files may represent a set of media files that are the "best" media files in terms of quality metrics (e.g., color, exposure, other aesthetic qualities, etc.), diversity, people or identifiable objects appearing in the photos, and so on. In this manner, the media curation engine 138 may curate a set of the user's best media files created at a particular location for sharing with other users 102.

The UI 332 may further include a share button 348 to share the selected photos from the curated set 336 of photos with the selected entities in the list of entities 334, and a share button 350 to share the selected photos from the curated set 336 with perhaps a broader or different audience on a website of the media file sharing service(s) 130.

While the example UIs 302, 312, and 332 are shown as being rendered as part of a local application or program on the computing device 104(1), it is to be appreciated that, in other instances, the UIs 302, 312, and 332 may be rendered as a web-based implementation (e.g., a web page served by the cloud storage service(s) 118 and rendered via a web browser on the computing device 104(1), or any other UI mechanism.

Example Processes

FIGS. 4-9 are a flow diagram of example processes according to embodiments disclosed herein. The processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. Moreover, in some embodiments, one or more blocks of the processes may be omitted entirely.

Figure 4:
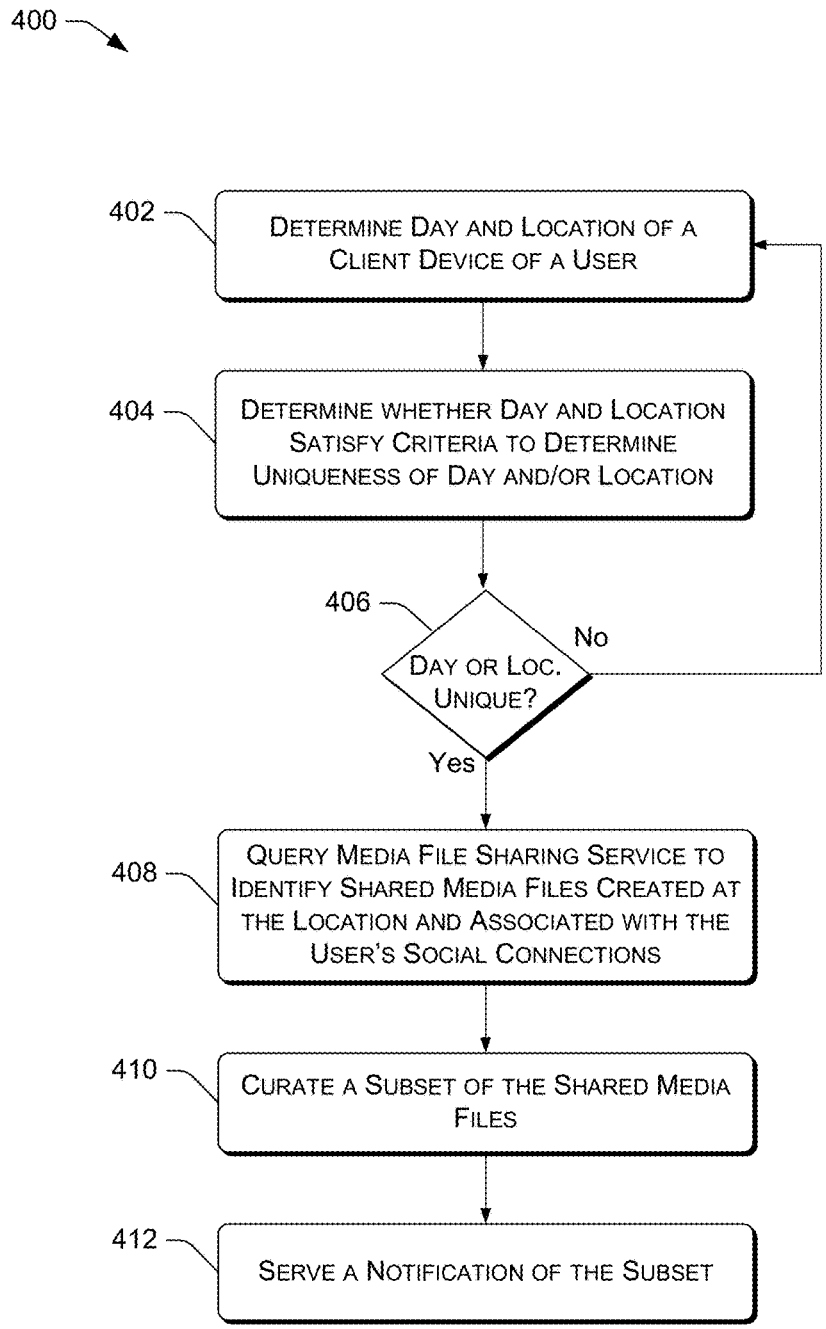
FIG. 4 is a flow diagram of an illustrative process of curating shared media files.

FIG. 4 is a flow diagram of an illustrative process 400 of curating shared media files. The process 400 is described with reference to the architecture 100 of FIG. 1, and with particular reference to the location module 140, the uniqueness module 144, the query module 146, the curator 154, and the notification module 160, among other elements shown in FIG. 1.

At 402, a location of a client device 104(1) of a user 102(1) may be made by the location module 140, and a day associated with that location may also be determined by the media curation engine 138. In one scenario, the location may be a location of the client device 104(1) when the client device 104(1) transmits location data for the location without the user 102(1) having created any media files, such as when the user 102(1) arrives at the Pyramids and the client device 104(1) "checks-in" with the location module 140 by transmitting location data (e.g., GPS coordinates) thereto. In this scenario, the day associated with the location at 402 may comprise the current day, which may be determined with reference to a clock or calendar accessible to the media curation engine 138. In at least one other example scenario, the client device 104(1) may have been used to create a media file (e.g., take a picture), such as the media file 200, at the location prior to the determining at 402. In this scenario, the location may comprise a location of the client device 104(1) at a time when the media file 200 was created, and the day may comprise the day that the media file 200 was created using the client device 104(1), which may be a current day in some instances. In any case, the determining at 402 may occur without any explicit request being received from the user 102(1) such that the process 400 initiates automatically, and may begin as a result of transmitted location data that occurs either periodically, or upon creation or importation of a media file using the client computing device 104(1).

At 404, the uniqueness module 144 may determine whether the day satisfies one or more criterion indicative of the day being unique to the user 102(1), and whether the location satisfies one or more criterion indicative of the location being unique to the user 102(1). For example, the location may satisfy a criterion that the user 102(1) has infrequently, or never, visited the location to indicate that the location is unique, and/or other criteria noted above that may be evaluated individually, or in combination with other criteria, to make a uniqueness determination. Furthermore, the day may satisfy a criterion that the day is the birthday of the user 102(1), and/or other criteria noted above that may be evaluated individually, or in combination with other criteria, to make a uniqueness determination.

At 406, a determination may be made as to whether the day or the location is unique based at least in part on the satisfaction of one or more of the criteria at 404. If the day and the location are not deemed unique at 406, the process 400 may return to 402 to evaluate additional media files or new locations of the user 102(1), such as after the client device 104(1) moves to a new location, or when the client device 104(1) is used to create another media file. If the day or the location is determined to be unique at 406, the process 400 may proceed to 408 where the query module 146 may query a media file sharing service(s) 130 to identify shared media files, such as the shared media files 208 of FIG. 2, that were created at the location determined at 402. The shared media files identified at 408 may be associated with one or more entities having social connections to the user 102(1), such as friends, family, coworkers, etc. In some embodiments, the query module 146 may select a hierarchical class of entities of a particular social circle (e.g., close friends and family) based on the uniqueness of the day or location determined at 406, which may comprise determining a level of uniqueness based on the number of criteria satisfied at 404. The query module 146 may also select an age to identify shared media files at or below the selected age, where the selected age is based at least in part on the uniqueness determined at 406.

At 410, the curator 154 may curate (select) a subset of the shared media files, such as the subset 218 of FIG. 2. The curation at 410 may be based on any of a number of factors, including the current state of relationship of the entities to the user 102(1), quality metrics of the shared media files, user interaction data (e.g., number of views, edits, "likes", comments, etc. from users 102), and so on. The curated subset at 410 may be stored in the form of an implicit album 156.

At 412, the notification module 160 may serve a notification of the subset to the client device 104(1), such as a push notification to the media application 112. In this manner, the media application 112 may notify the user 102(1) via the client device 104(1) of the implicit album 156 resulting from the curation at 410.

Figure 5:
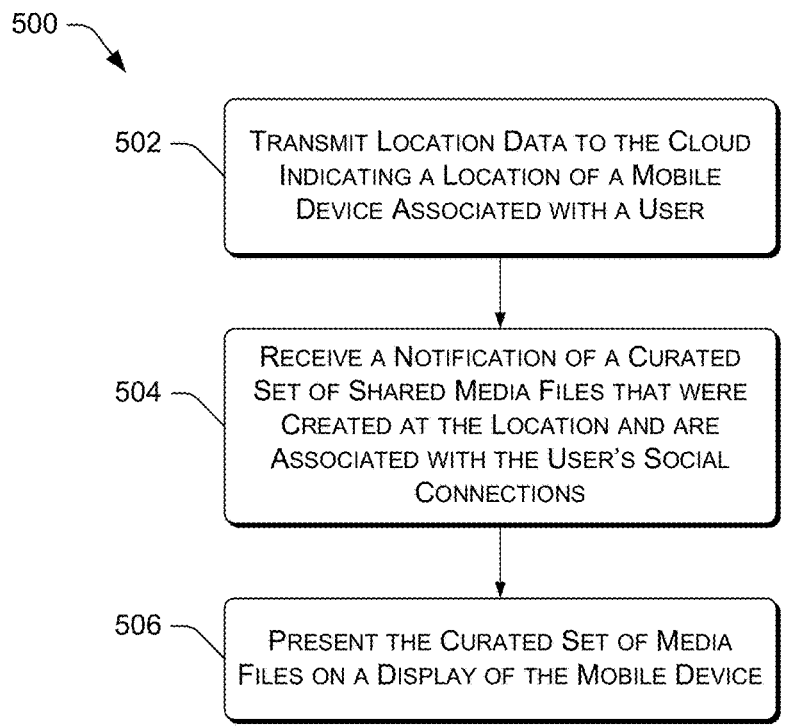
FIG. 5 is a flow diagram of an illustrative process of presenting a curated set of shared media files on a display of a client device.

FIG. 5 is a flow diagram of an illustrative process 500 of presenting a curated set of shared media files on a display of a client device, such as the client device 104(1). The process 500 is described with reference to the architecture 100 of FIG. 1, and with particular reference to the media application 112, among other elements shown in FIG. 1.

At 502, a mobile device associated with a user 102(1), such as the client device 104(1), may transmit location data to a cloud storage service(s) 118 that indicates a location of the mobile device. The location data may be transmitted as part of a "check-in" process of the mobile device that occurs periodically as authorized by the user 102(1). In other embodiments, the location data may be location-based metadata (e.g., a geotag) associated with a media file that was created using the mobile device at the location, such as an image file resulting from a picture taken at the location with the mobile device.

At 504, the mobile device may receive a notification of a curated set of shared media files that were created at the location (i.e., at, or within a threshold distance of, the location). The media files in the curated set may also be associated with entities having social connections to the user 102(1) such that the curated set of shared media files are relevant to the user 102(1) in multiple respects.

At 506, the curated set of media files (i.e., an implicit album 156) may be presented on a display of the mobile device. In some embodiments, the presentation at 506 may occur concurrently with the notification at 504 and may otherwise act as the notification at 504. In other embodiments, the presenting at 506 may occur in response to a selection of the notification at 504 when the notification is presented via a UI of the mobile device as a selectable option, such as the selectable option 308 in the notification 304 of FIG. 3. In some embodiments, the media files in the implicit album 156 that are presented at 506 in association with interaction elements (e.g., "like" UI elements, comment elements, re-share elements, etc.) to allow the user 102(1) to interact with the media files in the implicit album 156 via a social network, such as the media file sharing service(s) 130.

Figure 6:
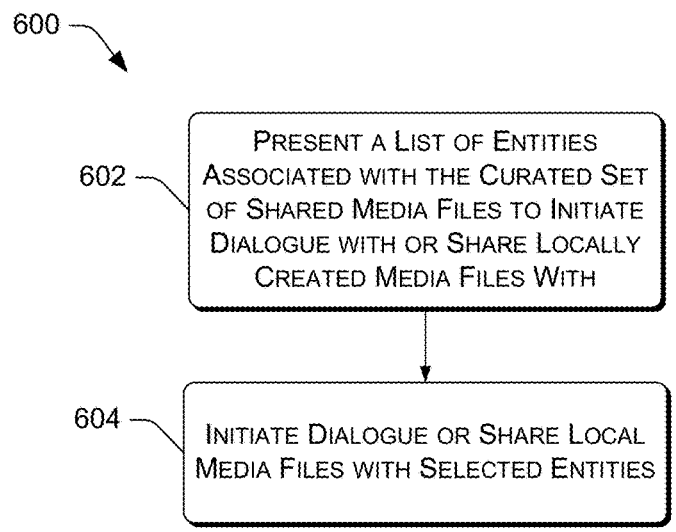
FIG. 6 is a flow diagram of an illustrative process of initiating a dialogue with social connections that have created media files at a same location of the user and/or sharing locally-created media files with the social connections.

FIG. 6 is a flow diagram of an illustrative process 600 of initiating a dialogue with entities having social connections to a user 102(1), the entities being associated with media files created at a same location of the user 102(1), and/or sharing locally-created media files with the entities. The process 600 is described with reference to the architecture 100 of FIG. 1, and with particular reference to the user interface module 158 and the dialogue module 164. Moreover, the process 600 may continue from step 506 of FIG. 5.

At 602, the user interface module 158 may cause presentation of a list of entities, such as the list of entities 334 of FIG. 3D, associated with a curated set of media files, such as the implicit album 156 presented at step 506 of FIG. 5. The user 102(1) may find it valuable or otherwise interesting to initiate a dialogue with one or more of the entities in the list 334 presented at 602, and as such, the presentation at 602 may include presenting a dialogue option 344 in association with individual ones of the entities in the list 334. If the user 102(1) selects the dialog option 344, a dialogue may be initiated at 604 by initiating a phone call, text message application, email application, video conference application, etc., on the client device 104(1).

The presentation at 604 may also allow the user 102(1) to share locally-created files with the list of entities, such as by sharing a curated set of the user's own media files that were created at the location indicated in the location data of step 502 of FIG. 5. In this manner, the user 102(1) may share media files he created at the location with the entities that have also been to the location or are otherwise associated with the media files in the implicit album 156 presented on the display of the mobile device at step 506 of FIG. 5.

Figure 7:
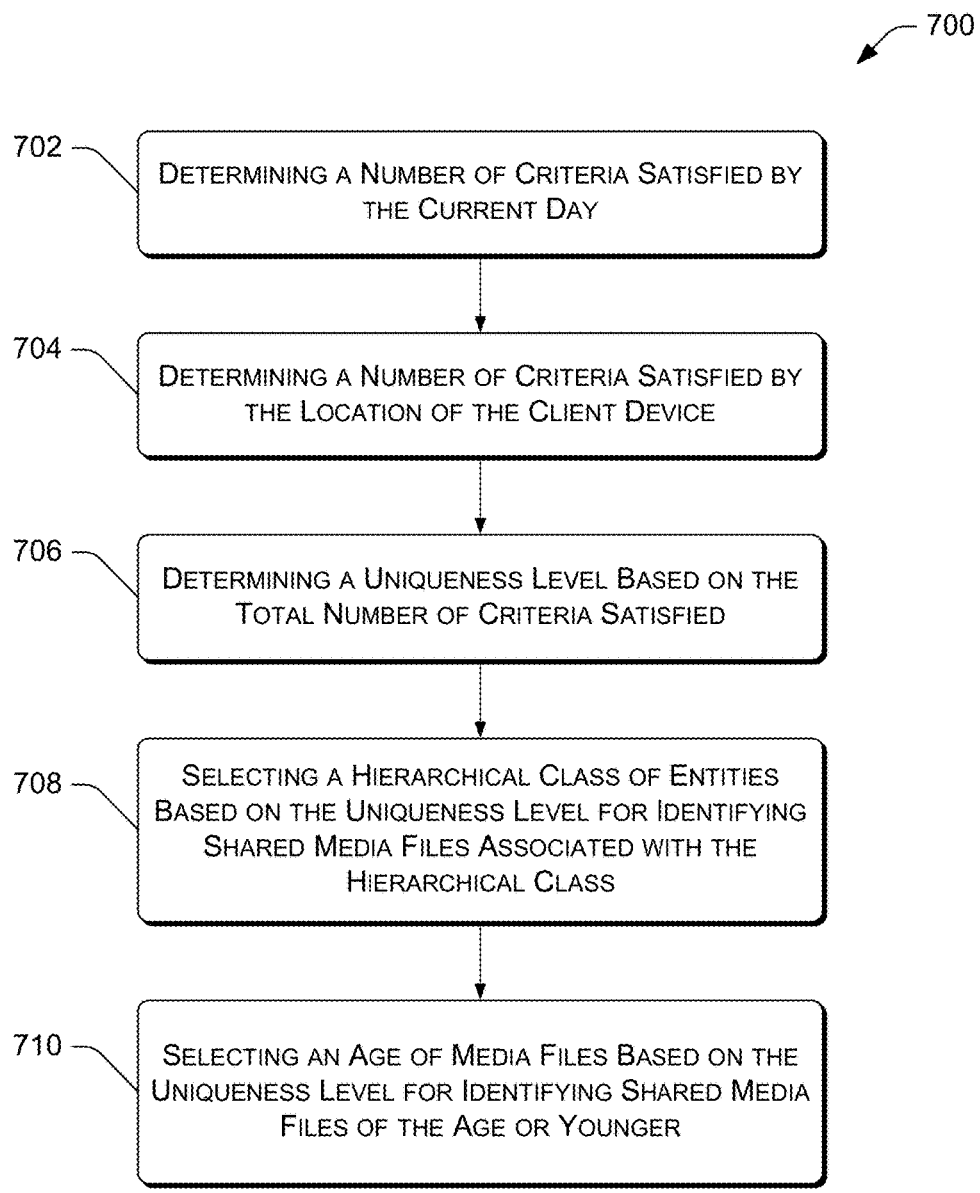
FIG. 7 is a flow diagram of an illustrative process of adjusting the scope of a user's social circle and selecting an age of media files to be queried based on the uniqueness of the day or location of the client device.

FIG. 7 is a flow diagram of an illustrative process 700 of scoping a user's social circle and selecting an age of media files for querying based on the uniqueness of the day or location of the client device. The process 700 is described with reference to the architecture 100 of FIG. 1 and the schematic diagram of FIG. 2, and with particular reference to the uniqueness module 144, and the query module 146, among other elements shown in FIGS. 1 and 2.

At 702, the uniqueness module 144, in determining the uniqueness level 204 of a day (such as a current day or the day that a media file 200 was created), may determine how many criteria are satisfied for that day. For example, the day may coincide with the user's birthday, or a wedding anniversary of the user 102(1). Any number of suitable criteria may be evaluated and totaled to determine the number of satisfied criteria at 702.

At 704, the uniqueness module 144, in determining the uniqueness level 204 of a location (such as a current location of the client device 104(1), or a location where a media file 200 was created using the client device 104(1)), may determine how many criteria are satisfied for the location. For example, the location of the client device 104(1) determined by the location module 140 may satisfy a criterion that it is beyond a threshold distance from a home of the user 102(1), and may satisfy another criterion that it is associated with a popular landmark or tourist attraction (e.g., the Pyramids), and so on.

At 706, a uniqueness level 204 may be determined based at least in part on the total number of criteria satisfied from steps 702 and 704. In general, the uniqueness level 204 increases with the number of criteria that are satisfied indicating uniqueness of the day or the location.

At 708, the query module 146 may select a hierarchical class of entities based at least in part on the uniqueness level 204 that is used for identifying shared media files associated with the hierarchical class. For example, the query module 146 may select a hierarchical class of entities associated with close friends and family of the user 102(1) because the uniqueness level 204 determined at 706 is relatively low, which may indicate that close friends and family may be associated with media files created at the location. In other scenarios, such as when the uniqueness level 204 determined at 706 is relatively high, the query module may select a hierarchical class of entities having more distant social connections to the user 102(1), such as co-workers, or even friends of social connections (e.g., friends by association).

At 710, the query module 146 may select an age of media files based on the uniqueness level 204 that is used for identifying shared media files that are of the selected age or younger. For example, when the uniqueness level 204 determined at 706 is relatively low, the query module 146 may select a younger age to identify more recently-created media files. The process 700 may allow the query module 146 to fine-tune its search for relevant media files to select a healthy set of media files to be curated by the curator 154.

Figure 8:
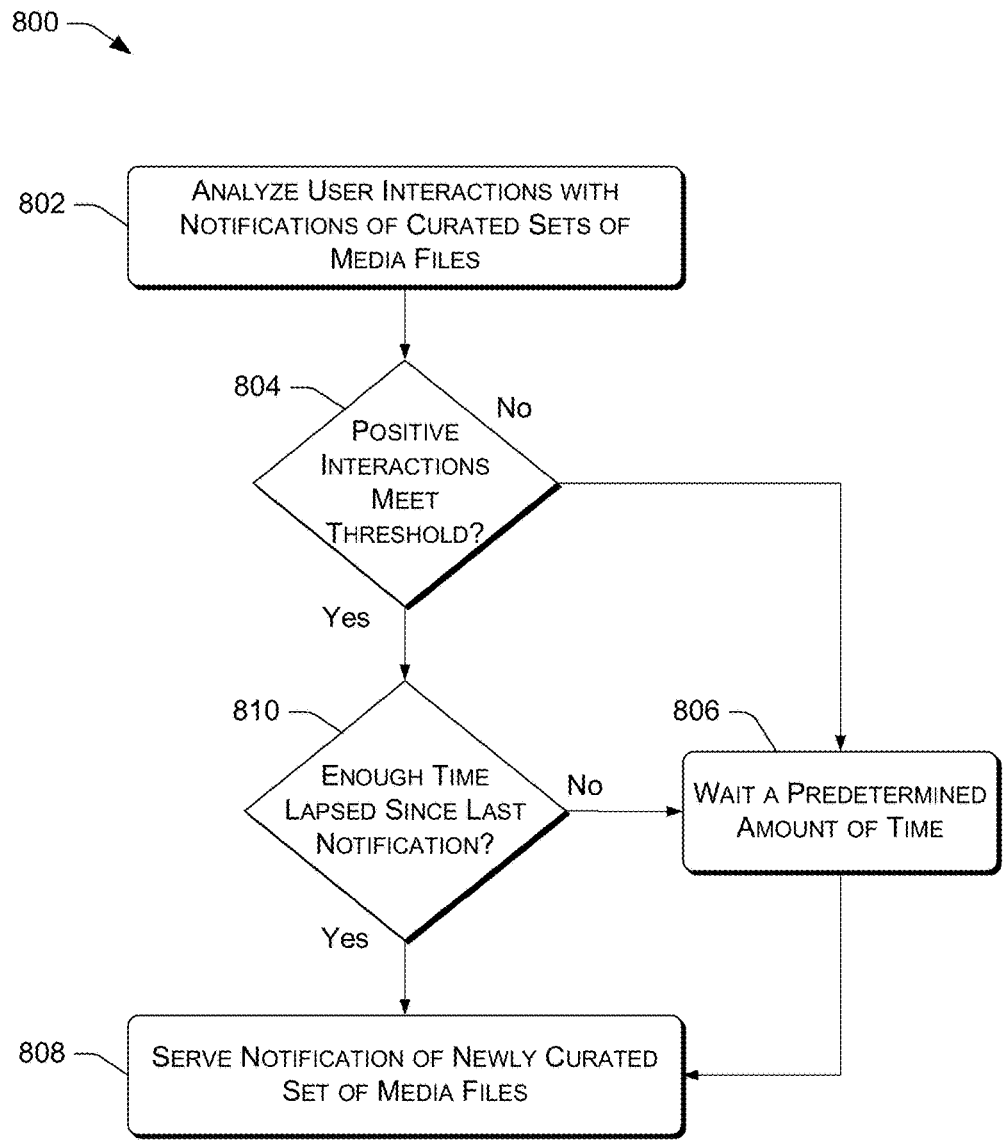
FIG. 8 is a flow diagram of an illustrative process of selectively notifying a user of a curated set of media files.

FIG. 8 is a flow diagram of an illustrative process 800 of selectively notifying a user 102(1) of a curated set of media files. The process 800 is described with reference to the architecture 100 of FIG. 1, and with particular reference to the analyzer 142, and the notification module 160.

At 802, the analyzer 142 may analyze past user interactions of the user 102(1) with previously served notifications of previously curated subsets (i.e., implicit albums 156) of shared media files to identify positive or negative user interactions. For example, the user may ignore or explicitly dismiss a notification of an implicit album 156, such as by selecting the dismiss option 306 of the notification 304 of FIG. 3B, which may be logged as a negative user interaction. The user 102(1) may alternatively interact positively with the notifications by selecting the option 308 of FIG. 3B to view the implicit album 156, or by selecting the "save" option 310 to save the implicit album 156, or at least the notification 304, for viewing the implicit album 156 at a later point in time. In this manner, the analyzer 142 may be configured to determine whether a frequency of positive interactions meets a threshold frequency at 804. That is, a number of positive user interactions per issued notification may be measured and used to compare to a threshold frequency at 804 to determine if the positive interactions meet or exceed the threshold.

If it is determined at 804 that there have not been enough positive interactions with past notifications, the process 800 may proceed to 806 where the notification module 160 waits a predetermined amount of time before serving the next notification at 808. The predetermined amount of time may be any suitable amount of time (e.g., minutes, hours, etc.) that may be tailored better to the user 102(1) based on the analysis at 802.

If it is determined at 804 that there have been enough positive interactions with past notifications, the process 800 may proceed to 810 where a determination may be made as to whether a predetermined amount of time has lapsed since a previously served notification, such as the last notification served by the notification module 160. The predetermined amount of time at 810 may be on the order of minutes, hours, or any suitable amount of time selected in order to tailor the frequency of the notifications to user preferences. If it is determined that the predetermined amount of time has not yet lapsed at 810, the process 800 may proceed to 806 where the notification module 160 waits a predetermined amount of time before serving the notification at 808. If it is determined at 810 that the predetermined time period has lapsed, the process 800 may proceed directly to serving the notification at 808.

It is to be appreciated that the user 102(1) may also configure settings of the client device 104(1) to explicitly adjust the frequency of notifications received from the notification module 160. The process 800 is a manner of adjusting to user preferences automatically and without user intervention.

Figure 9:
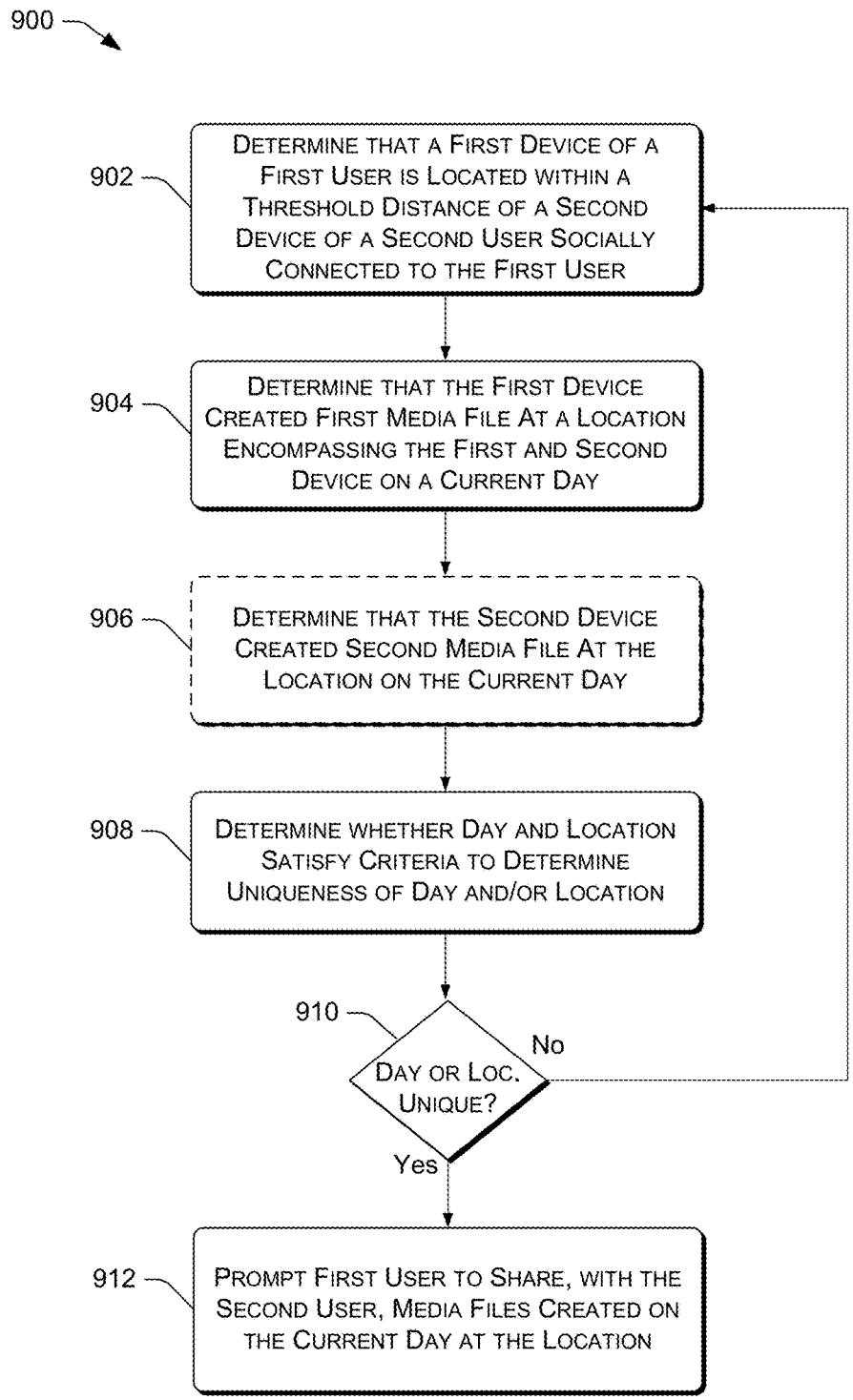
FIG. 9 is a flow diagram of an illustrative process of curating media files for collocated users.

FIG. 9 is a flow diagram of an illustrative process 900 of curating media files for collocated social connections. The process 900 is described with reference to the architecture 100 of FIG. 1, and with particular reference to the location module 140, the analyzer 142, the uniqueness module 144, and the notification module 160, among other elements shown in FIG. 1.

At 902, the location module 140 may determine that a first client device 104(1) of a first user 102(1) is located within a threshold distance of a second client device 104(2) of a second user 102(2) who is connected socially to the first user 102(1) on the media file sharing service(s) 130. For example, two users 102 who are friends and who are connected on the media file sharing service(s) 130 may take a trip to a location, such as a pumpkin patch. The location module 140 may determine the location of either or both of the client devices 104(1) and 104(2) using any of the abovementioned techniques, or perhaps by accessing the media file sharing service(s) 130 to determine that one or both of the users 102(1) and 102(2) have "checked-in" via the website or an application provided by the media file sharing service(s) 130. Check-ins via social networking services comprise posting information to a user's social connections that publicizes the location of the user 102. Although two users 102 and two associated client devices 104 are discussed in the example of FIG. 9, it is to be appreciated that the process 900 is not limited to determining that two devices are collocated. Rather, any number of collocated devices may be determined at 902, such as a group of friends on the media file sharing service(s) 130.

At 904, the analyzer 142 may determine that the first client device 104(1) has created a first media file (e.g., taken a picture) at a location encompassing the first client device 104(1) and the second client device 104(2) on the current day. The "location" at 904 is therefore most likely an area encompassing two point locations of the two client devices 104 since it is unlikely that the two devices 104 will be directly on top of one another.

The process 900 may include an optional step 906 of determining that the second client device 104(2) has created a second media file at the location. However, the step 906 may be omitted from the process 900 without changing the basic premise of the process 900.

At 908, the uniqueness module 144 may determine whether the current day satisfies one or more criterion indicative of the day being unique to the user 102(1), and whether the location encompassing the two devices 104 satisfies one or more criterion indicative of the location being unique to either or both of the users 102(1) and 102(2). For example, the location may satisfy a criterion that either the first user 102(1) and/or the second user 102(2) has infrequently, or never, visited the location to indicate that the location is unique, and/or other criteria noted above that may be evaluated individually, or in combination with other criteria, to make a uniqueness determination. Furthermore, the day may satisfy a criterion that the day is the birthday of either the first user 102(1) and/or the second user 102(2), and/or other criteria noted above that may be evaluated individually, or in combination with other criteria, to make a uniqueness determination.

At 910, a determination may be made as to whether the day or the location is unique based at least in part on the satisfaction of one or more of the criteria at 908. If the day and the location are not deemed unique at 910, the process 900 may return to 902 to evaluate new locations of the users 102, such as after the client devices 104(1) and 104(2) moves to a new location where they are collocated. If the day or the location is determined to be unique at 910, the process 900 may proceed to 912 where the notification module 160 prompts the first user 102(1) to share, with the second user 102(2), media files that the first user 102(1) has created on the current day at the location, including the media file created at 904. For example, the first user 102(1) may have taken several pictures while at the pumpkin patch with the second user 102(2), and because the media curation engine 138 determined that either the pumpkin patch was a unique location or the day was unique to either or both of the users 102(1) and 102(2), the second user 102(2) may be delighted to receive the pictures taken by the first user 102(1), possibly curated by the curator 154 and stored as an implicit album 156 that may be accessed by both the first user 102(1) and the second user 102(2).

In the event that the second client device 104(2) creates a second media file at the location on the current day, which may be determined at 906, the prompt at 912 may be further issued to the second user 102(2) in order to encourage both users 102(1) and 102(2) to create a combined album together by sharing their media files between each other. The combined album may be curated by the curator 154 to select the best media files between the two users 102(1) and 102(2) in terms of the various factors mentioned above including, but not limited to, quality metrics, diversity, whether either or both of the users 102(1) and 102(2) appear in the media files.

Furthermore, the process 900 may be enhanced by performing at least part of the process 400 for querying a media file sharing service(s) 130 to curate a subset of shared media files. That is, in the context of the example of FIG. 9, the media file sharing service(s) 130 may be queried by the query module 146 to identify shared media files created at the location and associated with social connections of both the first user 102(1) and the second user 102(2). In this manner, the users 102(1) and 102(2) may be notified of a curated set of media files that is associated with entities have social connections to the user 102(1) and the user 102(2). Each of the users 102(1) and 102(2) may then be provided with a list of these entities to share their locally created media files with, such as by sharing a combined album created with the process 900.

The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Example One

A method comprising: determining: (i) a current time (e.g., day and/or time of day), and (ii) a location of a client device associated with a user; determining that at least one of the current time or the location satisfies a criterion used to indicate instances in which the current time or the location is unique to the user (e.g., an absolute/binary unique or not unique determination, or a level of uniqueness); and at least partly in response to the determining that the at least one of the current time or the location satisfies the criterion: querying a media file sharing service to identify shared media files (e.g., an image file, a video file, an audio file, etc.) that were created at the location, the shared media files being associated with one or more entities having social connections to the user, curating a subset of the shared media files, and serving a notification of the subset.

Example Two

The method of Example One, wherein the location of the client device is determined from location data associated with a media file created by the client device at the location on the current time.

Example Three

The method of any of the previous examples, alone or in combination, wherein the one or more entities are associated with the shared media files by having: (i) created individual ones of the shared media files, (ii) re-shared individual ones of the shared media files, (iii) appeared in individual ones of the shared media files, or (iv) been tagged in individual ones of the shared media files.

Example Four

The method of any of the previous examples, alone or in combination, further comprising determining whether the current time satisfies first additional criteria; determining whether the location satisfies second additional criteria; and determining a level of uniqueness of the current time, the location, or both the current time and the location based at least in part on a total number of criteria that are satisfied among the criterion, the first additional criteria, and the second additional criteria.

Example Five

The method of any of the previous examples, alone or in combination, further comprising selecting a hierarchical class of entities based at least in part on the level of uniqueness, wherein the querying the media file sharing service comprises searching for shared media files that are associated with entities under the hierarchical class of entities.

Example Six

The method of any of the previous examples, alone or in combination, further comprising selecting an age of media files based at least in part on the level of uniqueness, wherein the querying the media file sharing service comprises searching for shared media files that are equal to, or younger than, the age.

Example Seven

The method of any of the previous examples, alone or in combination, wherein the shared media files comprise image files or video files, and wherein the curating the subset is based at least in part on visual features detected in the shared media files, social approval data or disapproval data regarding the shared media files, comment data regarding the shared media files, whether the one or more entities appear in the shared media files, or an age of the shared media files.

Example Eight

A mobile computing device comprising: a display; one or more processors; and memory storing computer-executable instructions that, when executed by the one or more processors, cause the one or more processors to perform acts comprising: transmitting, over a network, location data indicating a location of the mobile computing device, the mobile computing device being associated with a user, receiving a notification of a curated set of media files (e.g., an image file, a video file, an audio file, etc.) that were created at the location, the curated set of media files being associated with one or more entities having social connections to the user, and presenting the curated set of media files on the display.

Example Nine

The mobile computing device of Example Eight, further comprising an image capture component, the acts further comprising: capturing image content at the location; and storing, in the memory, a media file of the captured image content, the media file including the location data, and wherein the transmitting the location data is performed in response to the storing the media file, and wherein the presenting includes presenting the media file together with the curated set of media files on the display.

Example Ten

The mobile computing device of any of the previous examples, alone or in combination, the acts further comprising receiving user input to open a media application, wherein the transmitting the location data is performed in response to the receiving the user input to open the media application.

Example Eleven

The mobile computing device of any of the previous examples, alone or in combination, wherein the receiving the notification comprises presenting a selectable option on the display, the acts further comprising receiving a selection of the selectable option, and wherein the presenting the curated set of media files is performed in response to the receiving the selection of the selectable option.

Example Twelve

The mobile computing device of any of the previous examples, alone or in combination, wherein the one or more entities comprise a plurality of entities, and wherein each of the plurality of entities either created an individual media file in the curated set of media files or appear in an individual media file in the curated set of media files, the acts further comprising: presenting a list of the plurality of entities on the display; and presenting an option that, upon selection of the option, initiates a dialogue with one or more of the plurality of entities.

Example Thirteen

The mobile computing device of any of the previous examples, alone or in combination, the acts further comprising: curating, from a collection of media files stored in the memory, a subset of media files that were created at the location using the mobile computing device; and presenting a share option, that upon selection of the share option, shares the subset of media files with individual ones of the one or more entities.

Example Fourteen

The mobile computing device of any of the previous examples, alone or in combination, the acts further comprising presenting an interaction element associated with individual ones of the media files in the curated set of media files, the interaction element allowing the user to approve or disapprove, re-share, or comment on a respective media file in the curated set of media files.

Example Fifteen

A system comprising: one or more processors; and memory storing computer-executable instructions that, when executed by the one or more processors, cause the one or more processors to perform acts comprising: determining: (i) a day that a media file was created using a client device associated with a user; and a location of the client device when the media file was created; determining that at least one of the day or the location satisfies a criterion used to indicate instances in which the day or the location is unique to the user; and at least partly in response to the determining that the at least one of day or the location satisfies the criterion: querying a media file sharing service to identify shared media files that were created at the location, the shared media files being associated with one or more entities having social connections to the user, curating a subset of the shared media files, and serving a notification of the subset.

Example Sixteen

The system of Example Fifteen the acts further comprising analyzing user interactions with previously served notifications of previously curated subsets of shared media files to identify positive or negative user interactions, and wherein the querying, the curating, and the serving occurs if the analyzing reveals that a threshold frequency of the positive user interactions have occurred.

Example Seventeen

The system of any of the previous examples, alone or in combination, wherein the serving the notification occurs after a predetermined amount of time has lapsed since a previously served notification of a previously curated subset of shared media files.

Example Eighteen

The system of any of the previous examples, alone or in combination, the acts further comprising determining that a bandwidth available to the client device is acceptable for downloading media files over a network, and wherein the serving the notification of the subset further includes causing presentation of the subset on the client device.

Example Nineteen

The system of any of the previous examples, alone or in combination, the acts further comprising: determining whether the day satisfies first additional criteria; determining whether the location satisfies second additional criteria; and determining a level of uniqueness of the day, the location, or both the day and the location based at least in part on a total number of criteria that are satisfied among the criterion, the first additional criteria, and the second additional criteria.

Example Twenty

The system of any of the previous examples, alone or in combination, wherein the media file comprises an image file or a video file, and wherein the determining that the day satisfies the criterion comprises determining that an entity having a social connection to the user appears in the image file or the video file.

Example Twenty-One

A system comprising: means for storing computer-executable instructions (e.g., memory, computer readable storage media such as RAM, ROM, EEPROM, flash memory, etc.); and means for executing computer-executable instructions (e.g., processor(s), including, for example, hardware processor(s) such as CPUs, SoCs, etc.) to cause performance of acts comprising: determining (i) a day that a media file (e.g., an image file, a video file, an audio file, etc.) was created using a means for computing (e.g., tablet computer, a smart phone, camera, etc.) associated with a user, and (ii) a location of the means for computing when the media file was created; determining that at least one of the day or the location satisfies a criterion used to indicate instances in which the day or the location is unique to the user; and at least partly in response to the determining that the at least one of the day or the location satisfies the criterion: querying a means for storing shared media files (e.g., a database or data store of a media file sharing service, a database or data store of a social networking service, etc.) to identify shared media files that were created at the location, the shared media files being associated with one or more entities having social connections to the user, curating a subset of the shared media files; serving a notification of the subset.

Example Twenty-Two

The system of Example Twenty-One the acts further comprising determining that a bandwidth available to the means for computing is acceptable for downloading media files over a means for transmitting data (e.g., a network such as the Internet, a telecommunications network, wireless network, etc.), and wherein the serving the notification of the subset further includes causing presentation of the subset on means for computing.

Example Twenty-Three

A system comprising: means for storing computer-executable instructions (e.g., memory, computer readable storage media such as RAM, ROM, EEPROM, flash memory, etc.); and means for executing computer-executable instructions (e.g., processor(s), including, for example, hardware processor(s) such as CPUs, SoCs, etc.) to cause performance of acts comprising: determining: (i) a current time (e.g., day and/or time of day), and (ii) a location of means for computing (e.g., tablet computer, a smart phone, camera, etc.) associated with a user; determining that at least one of the current time or the location satisfies a criterion used to indicate instances in which the current time or the location is unique to the user; at least partly in response to the determining that the at least one of the current time or the location satisfies the criterion: querying a means for storing shared media files (e.g., a database or data store of a media file sharing service, a database or data store of a social networking service, etc.) to identify shared media files that were created at the location, the shared media files being associated with one or more entities having social connections to the user, curating a subset of the shared media files, and serving a notification of the subset.

Example Twenty-Four

The system of Example Twenty-Three, wherein the location of the means for computing is determined from location data associated with a media file (e.g., an image file, a video file, an audio file, etc.) created by the means for computing at the location on the current time.

Example Twenty-Five

A mobile means for computing (e.g., tablet computer, a smart phone, camera, etc.) comprising: a means for displaying data (e.g., a display), a means for storing computer-executable instructions (e.g., memory, computer readable storage media such as RAM, ROM, EEPROM, flash memory, etc.); and means for executing computer-executable instructions (e.g., processor(s), including, for example, hardware processor(s) such as CPUs, SoCs, etc.) to cause performance of acts comprising: transmitting, over a means for transmitting data (e.g., a network such as the Internet, a telecommunications network, wireless network, etc.), location data indicating a location of the mobile means for computing, the mobile means for computing being associated with a user; receiving a notification of a curated set of media files that were created at the location, the curated set of media files being associated with one or more entities having social connections to the user; and presenting the curated set of media files on the means for displaying data.

Example Twenty-Six

The mobile means for computing of Example Twenty-Five further comprising a means for forming an image (e.g., an image capture device including a camera), the acts further comprising: capturing image content at the location; storing, in the means for storing computer-executable instructions, a media file (e.g., an image file, a video file, an audio file, etc.) of the captured image content, the media file including the location data, and wherein the transmitting the location data is performed in response to the storing the media file, and wherein the presenting includes presenting the media file together with the curated set of media files on the means for displaying data.

Example Twenty-Seven

The mobile means for computing of any of the previous examples, alone or in combination, wherein the receiving the notification comprises presenting a selectable option on the means for displaying, the acts further comprising receiving a selection of the selectable option, and wherein the presenting the curated set of media files is performed in response to the receiving the selection of the selectable option.

Example Twenty-Eight

The mobile means for computing of any of the previous examples, alone or in combination, wherein the one or more entities comprise a plurality of entities, and wherein each of the plurality of entities either created an individual media file in the curated set of media files or appear in an individual media file in the curated set of media files, the acts further comprising: presenting a list of the plurality of entities on the means for displaying, and presenting an option that, upon selection of the option, initiates a dialogue with one or more of the plurality of entities.

Example Twenty-Nine

The mobile means for computing of any of the previous examples, alone or in combination, the acts further comprising: curating, from a collection of media files stored in the means for storing computer-executable instructions, a subset of media files that were created at the location using the mobile means for computing; and presenting a share option, that upon selection of the share option, shares the subset of media files with individual ones of the one or more entities.

CONCLUSION

In closing, although the various embodiments have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A method comprising:
determining:
a current time; and
a location of a client device associated with a user;
determining whether the location satisfies a first criterion of a plurality of criteria, the first criterion based on a correlation between the location of the client device and locations of known landmarks;
accessing calendar events associated with the user, the calendar events including at least one of birthdays, anniversaries, or holidays;
determining whether the current time satisfies a second criterion of the plurality of criteria, the second criterion based on a correlation between the current time and the calendar events;
determining that at least one of the current time or the location satisfies at least one of the first criterion or the second criterion;
determining whether the current time or the location that satisfies at least one of the first criterion or the second criterion also satisfies one or more additional criteria of the plurality of criteria;
determining a total number of criteria that are satisfied from the plurality of criteria;
determining a uniqueness level of the current time or the location based at least in part on the total number of criteria that are satisfied; and
at least partly in response to determining that the uniqueness level meets or exceeds a uniqueness threshold:
determining, based at least in part on the uniqueness level meeting or exceeding the uniqueness threshold, a social circle scope and a file age threshold;
querying a media file sharing service to identify shared media files that were created at the location, the shared media files being associated with one or more entities having social connections to the user that is within the social circle scope, and the shared media files being no older than the file age threshold;
selecting a subset of the shared media files;
serving a notification of the subset to the client device; and
presenting the subset on a display of the client device.

2. The method of claim 1, wherein the location of the client device is determined from location data associated with a media file created by the client device at the location at the current time.

3. The method of claim 1, wherein the one or more entities are associated with the shared media files by having: (i) created individual ones of the shared media files, (ii) re-shared individual ones of the shared media files, (iii) appeared in individual ones of the shared media files, or (iv) been tagged in individual ones of the shared media files.

4. The method of claim 1, wherein the shared media files comprise image files or video files, and wherein the selecting the subset is based at least in part on visual features detected in the shared media files, social approval data or disapproval data regarding the shared media files, comment data regarding the shared media files, whether the one or more entities appear in the shared media files, or an age of the shared media files.

5. The method of claim 1, wherein:
the determining that at least one of the current time or the location satisfies at least one of the first criterion or the second criterion comprises determining that the location satisfies the first criterion and the one or more additional criteria of the plurality of criteria comprises:

determining whether the location satisfies a third criterion of the plurality of criteria, the third criterion based on determining whether the location is beyond a threshold distance from a residence of the user or a place of employment of the user; and determining whether the location satisfies a fourth criterion of the plurality of criteria, the fourth criterion based on determining whether the location is visited by the user below a predetermined frequency.

6. The method of claim 1, further comprising sharing the subset to devices associated with the one or more entities having social connections to the user that is within the social circle scope.

7. The method of claim 1, wherein the serving the notification occurs after a predetermined amount of time has lapsed since a previously served notification of a previously curated subset of shared media files.

8. A system comprising:
one or more processors; and
memory storing computer-executable instructions that, when executed by the one or more processors, cause the one or more processors to perform acts comprising:
   determining a location where a client device associated with a user was located when a media file was created using the client device;
   determining whether the location satisfies a first criterion based on the location being beyond a threshold distance from a residence of the user or a place of employment of the user;
   determining whether the location satisfies a second criterion based on the location being a place where at least a predetermined number of media files have been created by respective computing devices of at least a predetermined number of users over a given time period;
   determining whether the location satisfies a third criterion based on a correlation of the location to coordinates of known landmarks;
   determining that the location satisfies at least one of the first criterion, the second criterion, or the third criterion;
   determining a uniqueness level of the location based at least in part on a total number of criteria that are satisfied; and
   at least partly in response to the determining that the location satisfies the at least one of the first criterion, the second criterion, or the third criterion:
      determining a file age threshold for identifying shared media files, wherein the file age threshold is increased based on the uniqueness level;
      querying a media file sharing service to identify shared media files that were created at the location, the shared media files being associated with one or more entities having social connections to the user and being no older than the file age threshold;
      selecting a subset of the shared media files; and
      serving a notification of the subset to the client device.

9. The system of claim 8, the acts further comprising analyzing user interactions with previously served notifications of previously curated subsets of shared media files to identify positive user interactions or negative user interactions, and wherein the querying, the selecting, and the serving occurs if the analyzing reveals that a threshold frequency of the positive user interactions have occurred.

10. The system of claim 8, wherein the serving the notification occurs after a predetermined amount of time has lapsed since a previously served notification of a previously curated subset of shared media files.

11. The system of claim 8, the acts further comprising determining that a bandwidth available to the client device is acceptable for downloading media files over a network, and wherein the serving the notification of the subset further includes causing presentation of the subset on the client device.

12. The system of claim 8, the acts further comprising:
   determining whether the location satisfies one or more additional criteria;
   determining a total number of criteria that are satisfied among the first criterion, the second criterion, the third criterion, and the one or more additional criteria; and
   determining the uniqueness level of the location based at least in part on the total number of criteria that are satisfied,
   wherein the querying, the selecting, and the serving occur at least partly in response to determining that the uniqueness level meets or exceeds a uniqueness threshold.

13. The system of claim 8, the acts further comprising:
   determining a day that the media file was created using the client device; and
   determining that the day satisfies a different criterion,
   wherein the querying, the selecting, and the serving occur at least partly in response to determining that the day satisfies the different criterion.

14. A system comprising:
one or more processors; and
memory storing computer-executable instructions that, when executed by the one or more processors, cause the one or more processors to perform acts comprising:
   determining a current time and a location of a client device associated with a user;
   determining whether the location satisfies a first criterion of a plurality of criteria, the first criterion based on a correlation between the location of the client device and locations of known landmarks;
   accessing calendar events associated with the user, the calendar events including at least one of birthdays, anniversaries, or holidays;
   determining whether the current time satisfies a second criterion of the plurality of criteria, the second criterion based on a correlation between the current time and the calendar events;
   determining that at least one of the current time or the location satisfies at least one of the first criterion or the second criterion;
   determining whether the current time or the location that satisfies at least one of the first criterion or the second criterion also satisfies one or more additional criteria of the plurality of criteria;
   determining a total number of criteria that are satisfied from the plurality of criteria;
   determining a uniqueness level of the current time or the location based at least in part on the total number of criteria that are satisfied; and
   at least partly in response to determining that the uniqueness level meets or exceeds a uniqueness threshold:
      determining, based at least in part on the uniqueness level meeting or exceeding the uniqueness threshold, a social circle scope and a file age threshold;

querying a media file sharing service to identify shared media files that were created at the location, the shared media files being associated with one or more entities having social connections to the user that is within the social circle scope, and the shared media files being no older than the file age threshold;

selecting a subset of the shared media files;

serving a notification of the subset to the client device; and presenting the subset on a display of the client device.

15. The system of claim 14, wherein the location of the client device is determined from location data associated with the media file created by the client device at the location at the current time.

16. The system of claim 14, wherein the one or more entities are associated with the shared media files by having: (i) created individual ones of the shared media files, (ii) re-shared individual ones of the shared media files, (iii) appeared in individual ones of the shared media files, or (iv) been tagged in individual ones of the shared media files.

17. The system of claim 14, wherein the shared media files comprise image files or video files, and wherein the selecting the subset is based at least in part on visual features detected in the shared media files, social approval data or disapproval data regarding the shared media files, comment data regarding the shared media files, whether the one or more entities appear in the shared media files, or an age of the shared media files.

18. The system of claim 14, wherein the determining that at least one of the current time or the location satisfies at least one of the first criterion or the second criterion comprises determining that the location satisfies the first criterion and the one or more additional criteria of the plurality of criteria comprises:

determining whether the location satisfies a third criterion of the plurality of criteria, the third criterion based on determining whether the location is beyond a threshold distance from a residence of the user or a place of employment of the user; and determining whether the location satisfies a fourth criterion of the plurality of criteria, the fourth criterion based on determining whether the location is visited by the user below a predetermined frequency.

19. The system of claim 14, the acts further comprising sharing the subset to devices associated with the one or more entities having social connections to the user that is within the social circle scope.

20. The system of claim 14, wherein the serving the notification occurs after a predetermined amount of time has lapsed since a previously served notification of a previously curated subset of shared media files.

* * * * *